Feb. 21, 1939.　　　H. L. KRUM ET AL　　　2,147,656
COMMODITY QUOTATION SYSTEM
Filed Jan. 9, 1936　　　10 Sheets-Sheet 4

INVENTOR
HOWARD L. KRUM
ALBERT H. REIBER
BY
ATTORNEY

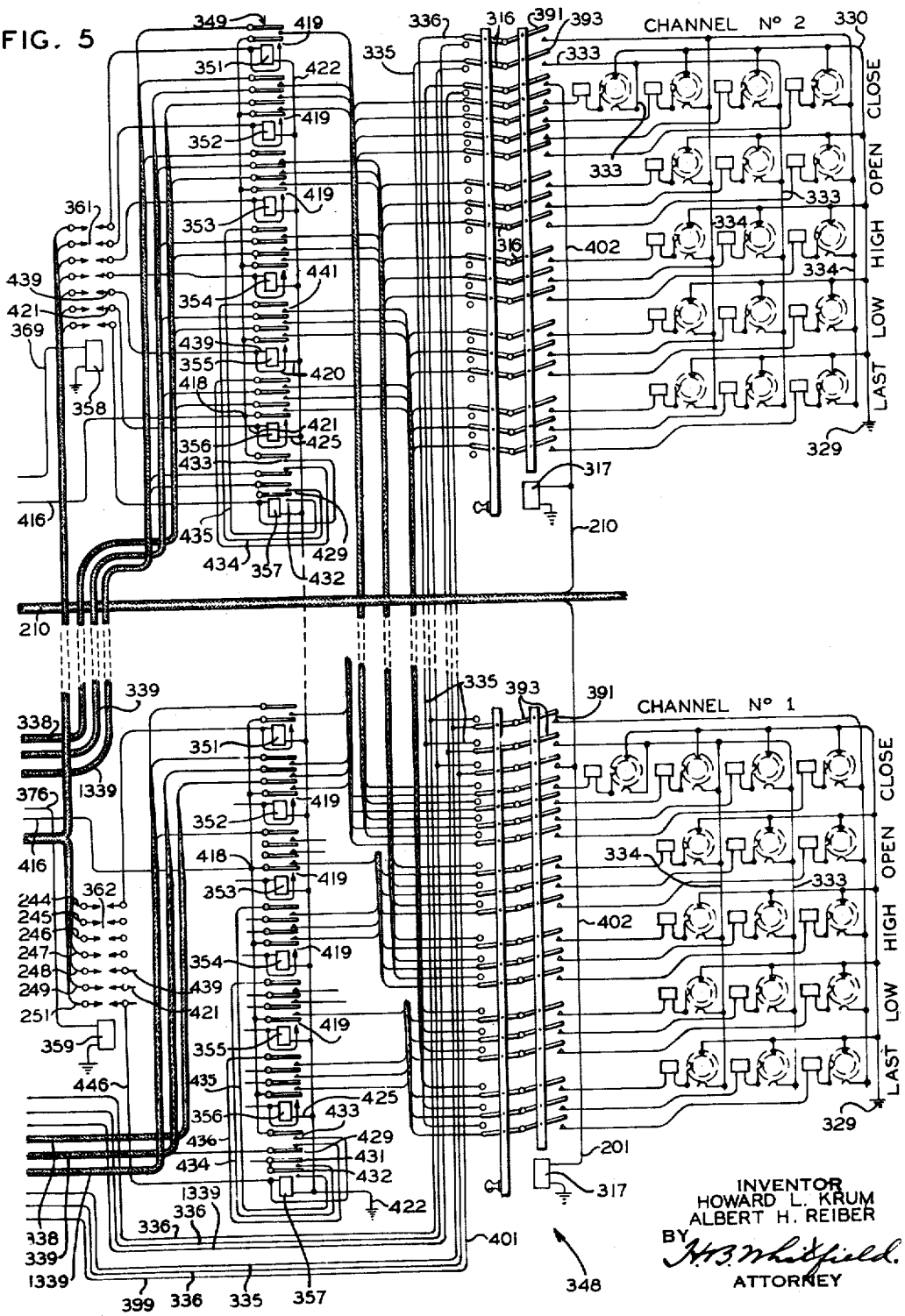

Feb. 21, 1939.     H. L. KRUM ET AL     2,147,656
COMMODITY QUOTATION SYSTEM
Filed Jan. 9, 1936     10 Sheets-Sheet 6

INVENTOR
HOWARD L. KRUM
ALBERT H. REIBER
BY
ATTORNEY

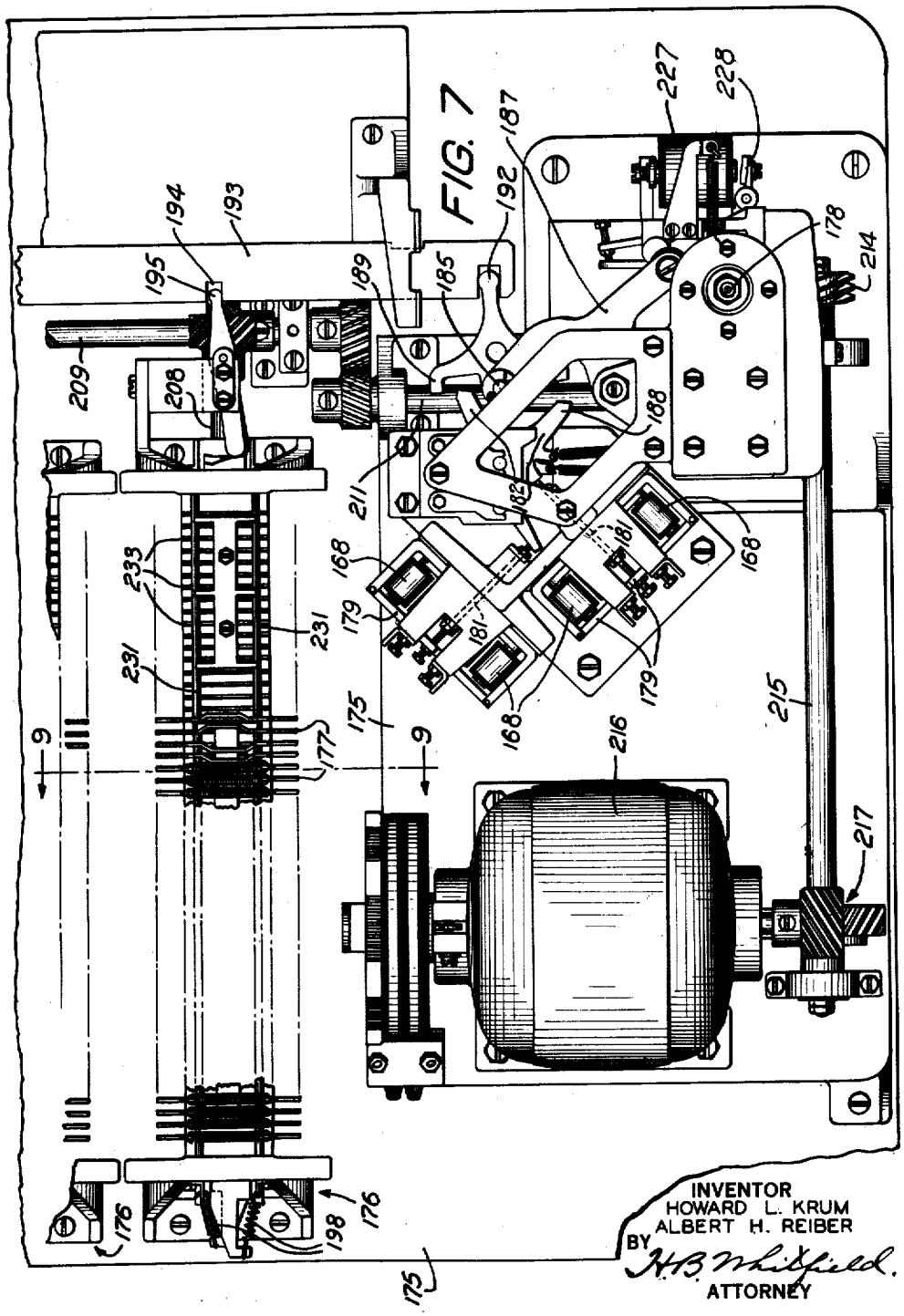

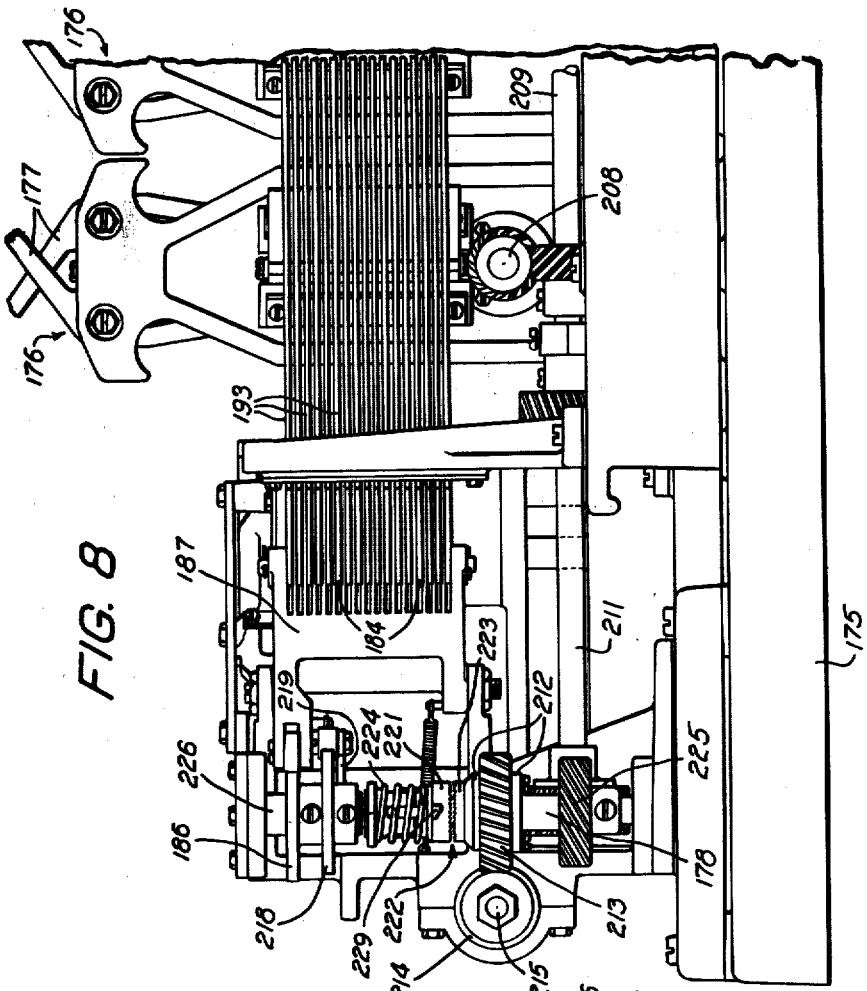

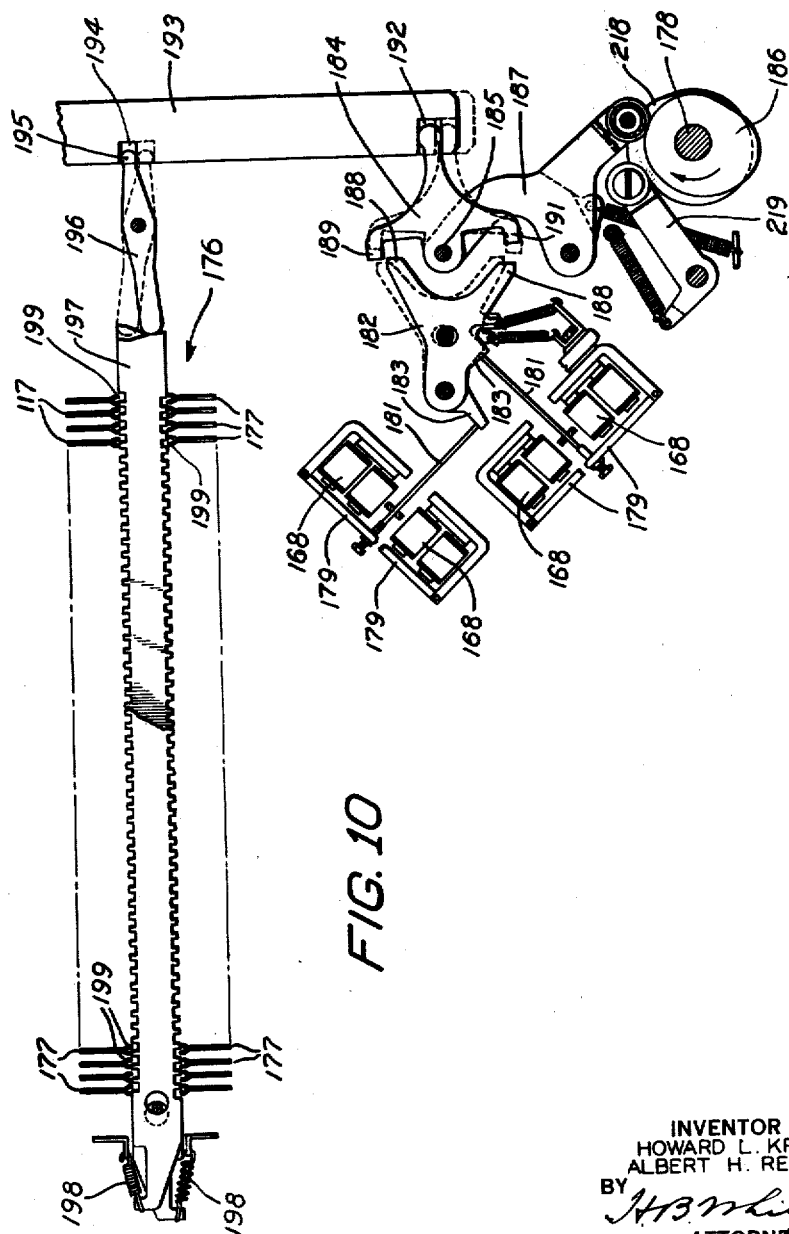

FIG. 11
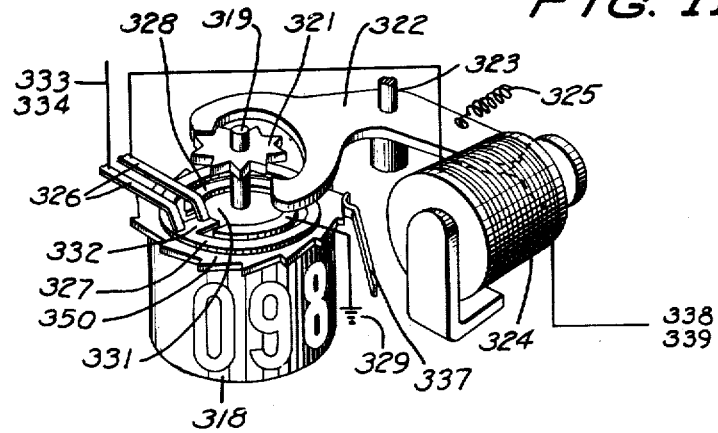
FIG. 12
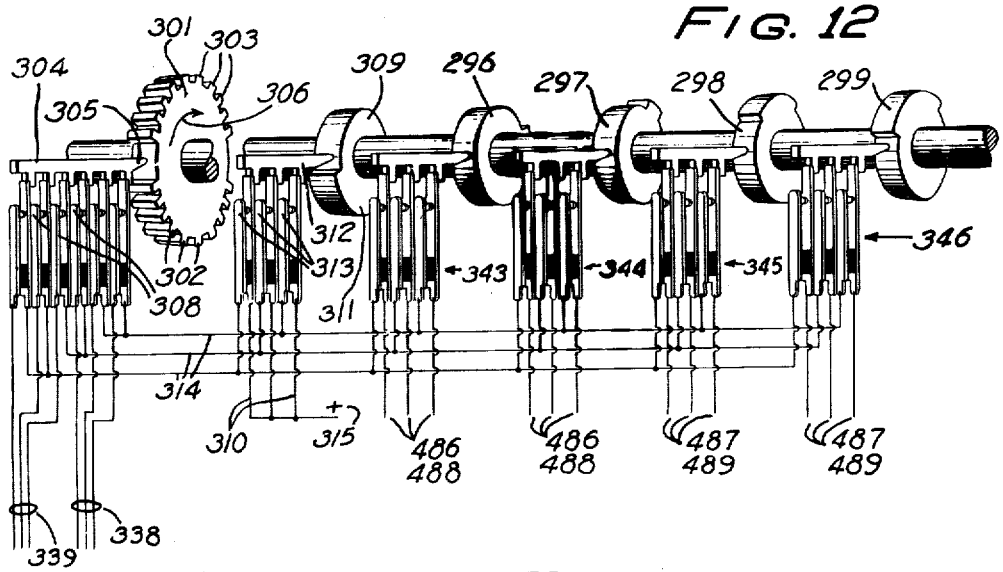
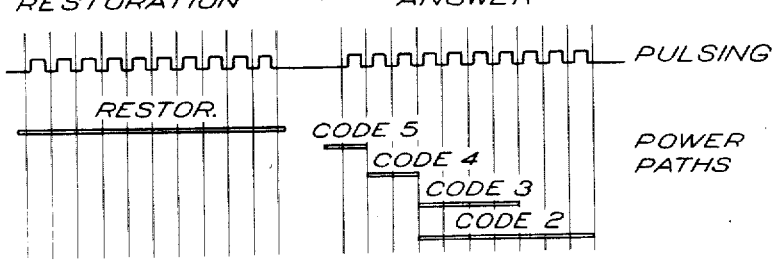
FIG. 13

Patented Feb. 21, 1939

2,147,656

UNITED STATES PATENT OFFICE 2,147,656

COMMODITY QUOTATION SYSTEM

Howard L. Krum, Kenilworth, and Albert H. Reiber, Evanston, Ill., assignors to Teletype Corporation, Chicago, Ill., a corporation of Delaware Application January 9, 1936, Serial No. 58,340

9 Claims. (Cl. 177—353)

The present invention concerns telegraph signalling systems and apparatus and relates more particularly to telegraphically controlled stock quotation boards and their methods of operation.

It has been the practice heretofore in operating a plurality of recording or indicating devices from a remote station over a single line of communication between a transmitting station and a receiving station, to provide selecting apparatus at the receiving station, which first operates in a manner to establish communication between the incoming line and one of the indicating devices and thereafter receives and records a price indication or other item of information upon the selected device. In accordance with this practice, two consecutive operations were necessary for performing each recordation; namely, a selection operation and an indicator operation, which obviously consumed a comparatively greater amount of line time for each quotation message, and accordingly diminished the speed of signal transmission.

In messages of uniform length or even in the case of variable length messages within predetermined numbers of signal intervals, it was observed that the switching and selecting operations at the receiving stations were inherently dilatory and that the speed of transmitting operations was materially impaired, so that even though transmitting facilities were capable of higher speeds, signal communication was restrained by the apparent physical limitations of the receiving appartus.

In order to increase the speed of communication, the present invention is proposed, having as its salient object to distribute the incoming signals at the receiving station or at an intermediate station through a plurality of channels, simultaneously selecting an indicator by the use of these plural channels, and recording upon the selected indicator signals received simultaneously over the plurality of channels.

The invention proposes, by increasing the number of channels over which a given message is received, to reduce the signalling time correspondingly, and to permit thereby concurrent operation of certain apparatus where heretofore it was necessary to perform such operations consecutively. Of prime importance also is the increased latitude of adjustment that is afforded by reason of the greater angular allotment to each impulse interval in a line over which but eight impulses are issued during a cyclic rotation as compared with one over which thirty-two such impulses are issued during each cyclic rotation. As a direct consequence, there is effected a vast saving in cost of materials and equipment such as otherwise is necessarily employed in order to maintain a high fidelity of synchronism. This economy is obtained because in the case of four wire transmission, the type of mechanism required to maintain synchronism is of the simplest elementary form such as start-stop distributor control, whereas in the case of thirty-two impulse single line transmission, mechanism of complex and costly intricacy is essential in order to phase properly the minute angular segments of transmission and reception distributors.

Another feature of the present invention in the provision of substation channelling apparatus is the elimination of certain costly mechanism from the equipment of several local stations by being provided singly at intermediate stations where relatively few such mechanisms can accommodate a plurality of local stations.

Toward attaining the several ends sought for, the present embodiment utilizes a single line "giant" distributor which receives five unit permutation code signals for stock items selection, four unit code signals for price integers and range selection, and a three unit signal for fractions indication. The essential elements of the several signals comprising a message are grouped together so as to constitute contiguous impulses. These are stored in banks of electrical relays from which they are then released four impulses at a time over four associated retransmission lines without regard to the primary grouping or relationship of the impulses which constitute signals.

At an ultimate station the impulses are collected from the four lines and each group is stored in a storage bank placed in close association with mechanism or apparatus which is to be affected thereby; the items selecting signals in the storage relays of a stock or commodity selector, the range signals in a group of fan circuit controlling relays, and the price signals in first a primary storage bank, thence over to one or another of a pair of secondary storage banks.

From the last described positions of storage the several groups of impulses become effective each in the execution and performance of its particular function. The stock selecting signals close a pair of contacts which initially energize an indicator group control magnet. The range selecting signals choose circuits over which the price impulses are to be conveyed, and in so doing are concerned with the preparation of paths to one or more of the horizontal rows of indicators comprising a selected group. Finally, the price selection or answer signals, as they are sometimes called, are converted from permutation impulses to corresponding intermittent pulsations while previously recorded prices are removed from the selected recorders and immediately thereafter the converted pulsations relating to the new prices are issued to operate the indicator dials.

The conversion of the price signals from permutation to step-by-step impulses is controlled by a channel timing shaft of which there are two in the featured embodiment, each associated with a predetermined portion of the total traffic. These timing shafts in addition to their functions as signal translators or converters also serve to time various steps in each channel and to restore the apparatus in time to render it effective for a subsequent cycle.

This invention is an improvement upon certain practices disclosed and described in copending applications serially numbered 510,536, 333,161, and 488,664, filed January 21, 1931, January 17, 1929, and October 14, 1930, respectively, reference being had to these applications for a full understanding of certain structures employed in connection with the present invention.

Other objects of this invention are such as will be disclosed in connection with the following description and as will be revealed in the accompanying drawings in which like reference characters designate similar parts throughout:

Fig. 1 is a wiring diagram of a substation embodying the features of the present invention;

Figs. 2 to 5, taken together, illustrate a wiring diagram of a local or indicator station embodying certain features of the present invention;

Fig. 7 is a plan view of a selector mechanism having embodied therein principles of the present invention, illustrated with portions broken away;

Fig. 8 is a side elevation of the device shown in Fig. 7;

Fig. 9 is a transverse section of one of the vertical tiers of a selector unit such as is illustrated in Figs. 7 and 8, and is taken approximately on line 9—9 of Fig. 7;

Fig. 10 is a fragmentary plan view of certain operating elements of the selector mechanism illustrated in Fig. 7;

Fig. 11 is a detailed perspective view of an indicator unit such as may be employed in connection with the present invention;

Fig. 12 is a perspective detail view of one of the channel timing shafts illustrating the arrangement of the pulsing cams and the code cams;

Fig. 13 is a timing diagram of one of the channel timing shafts illustrated in Fig. 12;

Fig. 15 is a chart illustrating the modified numerical transmission codes.

Figure 1:
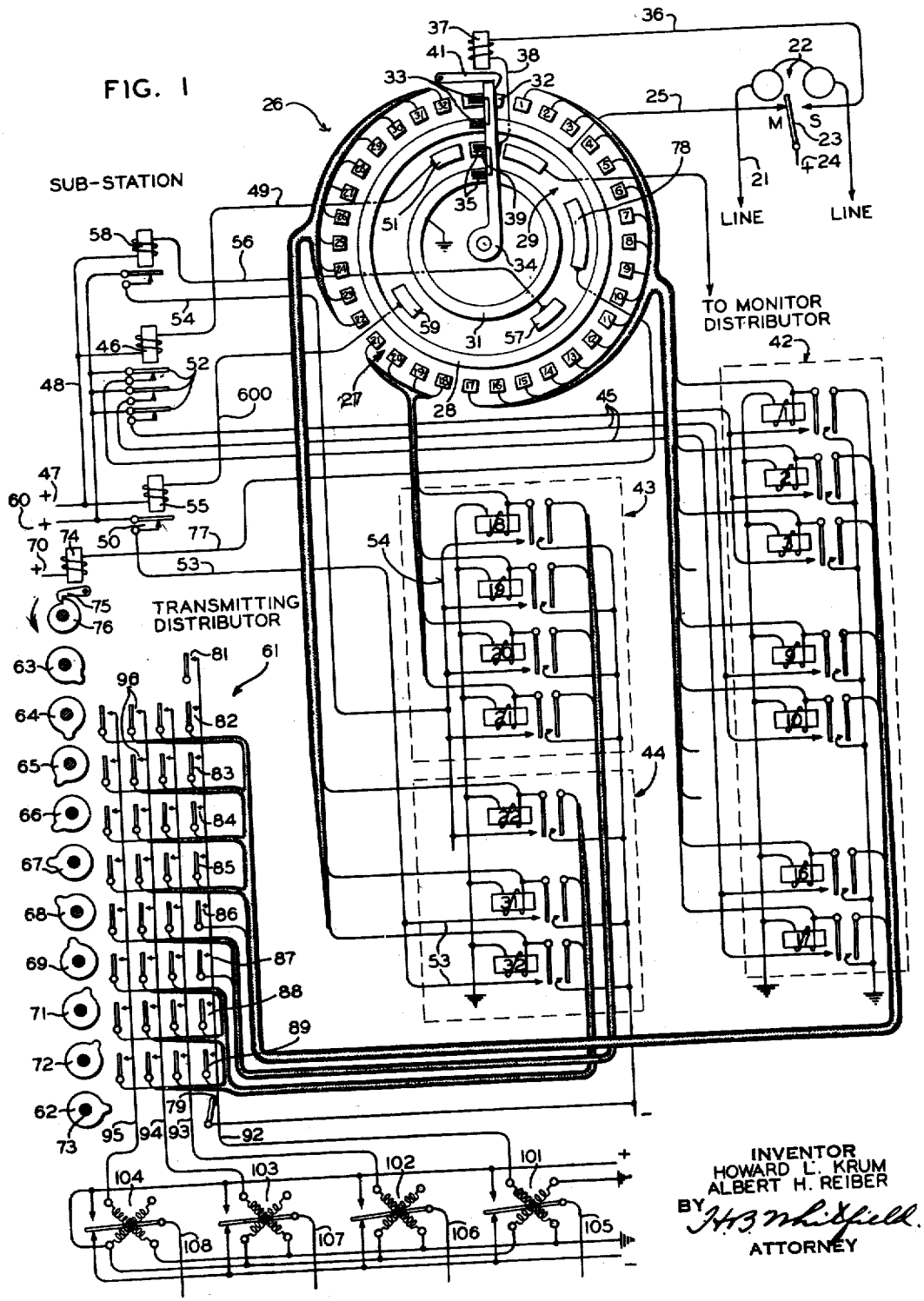

Reference is now had to the illustrations included in Figs. 1 to 5, wherein is contained the wiring diagram of a substation and a receiving station embodying the principles of the present invention. Signals from a remote transmitting station are impressed upon a line 21 in which are located one or more relays 22 preferably of the polarized type and in accordance with the electrical characteristic of each signal impulse the armature 23 thereof is moved between a pair contacts indicated M and S which represent marking and spacing signalling conditions. By means of the relay 22, the line signals are converted into local signals by providing a local source of current 24, connected to armature 23 and adapted to supply current potential to the various control circuits of the substation apparatus locally, either over line 25 which communicates with the distributor ring 28 or over line 36 which leads to the start magnet 37.

A rotary receiving distributor 26 includes four segment rings indicated generally 27, 28, 29, and 31. The outer ring 27 comprises, in addition to the stop segment 32, a plurality of signal impulse segments, thirty-two in number and indicated by the consecutive numeral designations from 1 to 32. Of these segments the first seventeen are related to the stock selecting signal impulses, the next four numbered from 18 to 21 the range selecting signal impulses, and the remaining eleven numbered 22 through 32 the answer or price recording signal impulses.

This particular allotment of signal impulses is arbitrary and is peculiar to the prevailing practice. It is designed to accommodate the selecting and recording functions of a stock quotation board. Any increase in the number of stocks that may be desired to be quoted may of course accordingly require a corresponding increase in the number of stock selecting signal impulses, and in like manner, any departures from the price and range recording practice may necessitate a corresponding change in the number or arrangement of their asociated segments. Changes of this character are deemed to be quite obvious, and their incorporation into the present showing to be within the realm of the present invention.

The second distributor ring 28 is solid and communicates over a conductor 25 with the marking contact M of the line relay 23. A pair of brushes 33 carried by the distributor arm 34 bridges the rings 27 and 28, conducting thereover the marking impulses from the source 24 over armature 23 and ring 28 to each or any of the various segments of ring 27 as the arm 34 and brushes 33 pass thereover. The third ring 29 contains but six segments that are variously located about the path described by a distributor brush 35 and are designed to perform certain timed functions for controlling the substation apparatus. The circuits completed through these segments bridge brushes 35 and are grounded through the fourth ring 31 which is a solid annular element.

The rotation of the distributor arm 34 is cyclically synchronized by the reception of a special spacing signal receivable when the arm is in the position indicated. When this occurs, the armature 23 is moved to the spacing position S, admitting positive potential from source 24 over a conductor 36 to the winding of a start magnet 37. This circuit continues over a return wire 38 to a segment 39 of the third distributor ring 29, thence over brushes 35 to the grounded ring 31. The reception of a spacing signal, when arm 34 is in this position, energizes magnet 37 to attract its armature 41 and to release it for rotation. It is understood, of course, that the motive power which rotates arm 34 is timed with that of a corresponding transmitting distributor at the remote transmitting station.

SUBSTATION STORAGE RELAYS

A set of thirty-two impulse storage relays are provided for storing the corresponding signal impulses as they pass through the several segments of the distributor ring 27. For convenience in identification, these relays are indicated in grouped blocks corresponding to their character or function, the first seventeen being contained within the block 42, the next four within the block 43, and the remaining eleven in the block 44. The arrangement of these relays is shown in Fig. 1. It will be noted that the locking circuits 45 of the several relays are divided into three groups having successive operation so as to permit an overlap in the storage and release performance of each. With the seventeen stock selecting relays there is associated a set of three conductors 45 which function simultaneously and which might have been shown as a single wire but which are distributed over three channels simply in order to reduce the load of a single conductor. These conductors are controlled by a locking relay 46 energized from a source of current potential 47 over a lead 48, through the winding of relay 46, thence over conductor 49 to a segment 51 of ring 29 encountered in final portion of the cycle of revolution of distributor arm 34. Relay 46 is energized when ground is introduced through ring 31 and brushes 35 to segment 51, and the withdrawal of contactors 52 opens the several locking circuits 45, restoring the stock selecting relays 42 to normal or deenergized condition.

In a similar manner the range selecting relays receiving their impulses from segments 18 through 21 of distributor 26 and the price relays receiving their impulses from the remaining segments 22 through 32 are periodically energized from a current source 60 but their locking circuits 53 and 54 communicate, the latter with the four relays of the block 43 and also with the first four relays of block 44, and the former with the remaining seven relays of block 44. A release relay 55 opens the locking circuit 53 at contacts 50 and is energized from the source 47 through the winding of relay 55 over conductor 600 to a segment 59 located in ring 29. The relays associated with the locking circuit 53 are released just as the arm 34 encounters the segment 59, at which time it operates to clear some of the storage relays of bank 44 for introducing a new set of storage conditions to the seven relays assigned to it. Release relay 58, in a similar manner, controls locking circuit 54 and is energized over a similar circuit 56 from segment 57, also located in ring 29. This locking circuit too is released just ahead of its associated distributor segments so as to permit the retention of the signals in associated storage relays of banks 43 and 44 for a maximum length of time or until, through the progress of the distributor arm 34, a new set of signals is in readiness to be installed.

SUBSTATION TRANSMITTING DISTRIBUTOR

With the signals stored in their respective relays, it then becomes the object of the substation apparatus to release them for retransmission to one or more local receiving stations. This is accomplished in the following manner: A transmitting distributor, generally indicated 61, Fig. 1, and containing a set of transmitting cams numbered 62 through 72, carried upon a shaft 73, rotates in timed relation with the receiving distributor arm 34. Each revolution of arm 34 corresponds to a complete rotation of shaft 73 of distributor 61. Shaft 73 is cyclically released by the energization of a magnet 74 which withdraws the stop armature 75 from the stop disc 76. Magnet 74 is energized over a circuit beginning with positive potential 70 through the winding of relay 74, over conductor 77, and segment 78, located in ring 29. Ground is introduced into circuit 77 when the brushes 35 pass over segment 78, bridging it with grounded ring 31. When shaft 73 is released, it proceeds to rotate counter-clockwise, as indicated in the exploded view of Fig. 1, while the several apices of cams 62 through 72 proceed to successively present themselves into engagement with their associated contact banks 79 and 81 through 89. As each bank is closed by its associated cam apex, it brings into engagement the contact points located in the circuits 92 through 95 with their associated contactors 96.

There being ten cam discs 62 through 72, each having an individual effective interval, the distributive cycle may be considered as constituted of ten cyclic intervals. During each of said intervals, in the case of each of the contact banks 82 through 89, four signal impulses are simultaneously transmitted over the conductors 92 through 95. During the normal or rest position with locking armature 75, as indicated, preventing the rotation of shaft 73, the apex of cam 62 engages its contactor 96, the latter engaging but a single contact member 79 in contradistinction with the quadruple contact members of the eight succeeding cams. Contact 79 of cam 62 thus being normally closed, introduces negative or marking potential upon conductor 92. This, as will be described hereinafter, is for the purpose of synchronizing or maintaining the receiving distributor shaft of the local station in cyclic alignment with that of the substation transmitting distributor 61.

When shaft 73 begins its rotation, the apex of cam 62 rides off of its contact bank 79, and the apex of cam 63 following thereafter closes its contact 81, which also comprises but a single pair of contacts. The contactor 96 of contact 81 is connected to no-current or neutral so that the next ensuing impulse that is impressed upon conductor 92 is of no-current condition, it being understood that for local station purposes current and no-current signalling conditions are accepted as preferable to that of plus and minus current conditions, which is preferable for line signalling. In accordance with the present disclosure, this practice has been illustrated, and accordingly means are provided for converting the current and no-current local signal conditions of the substation to plus and minus current conditions over the four conductors 105 to 108 connecting the substation with each local receiving station.

In the order indicated, cams 64 through 72 are rotated so that their respective apices successively close their contact banks 82 through 89. This succeeds the closure of contact 81, while following the closure of the final contact bank 89, cam 62 again assumes the position indicated in Fig. 1, closing the contacts 79 and maintaining the stop condition pending the reception of a succeeding start signal. Accordingly the thirty-two consecutive signals, which are received over distributor 26 are transposed into thirty-two corresponding signal impulses transmitted in eight principal groups of four impulses each.

Noteworthy is the arrangement of apparatus at the substation which affords this elasticity of impulse grouping so that whereas the primary signals are made up of five unit groups, four unit groups, and a three unit group, the retransmission is executed four impulses at a time and without restriction to primary grouping or signal arrangement. In fact, the retransmission grouping may be said to be truly an indiscriminate regrouping except that during the reinstatement of the signals at the ultimate station an exactly inverse process must be effected.

The translation of the current and no-current signals into plus and minus signals is accomplished over the transmitting relays 101 through 104 in the conventional and well-known manner, whence they continue upon conductors 105 through 108 as plus and minus current conditions. When these signals are received at the local station, they are preferably reconverted to current and no-current signals over receiving polar relays 109 to 113 where they are reconverted to their original condition, which, as mentioned above, is generally preferred for local operating purposes.

LOCAL RECEIVING STATION

*Receiving distributor*

After being reconverted at the local receiving station, the signals are then rearranged into their original consecutive order. This transposition is accomplished by means of a receiving distributor that functions in an order substantially reverse to that of the transmitting distributor 61 at the substation just described. Leading from the armatures 114 of relays 109 through 113 are four collector circuits 115 to 118, each of which communicates with certain contact points of eight sets of contact banks 119 and 121 through 127. Associated with each bank of contacts is a cam, the several of which are generally similar to the cams 64 through 72 of the transmitting distributor 61. The corresponding cams of the receiving distributor 128 are numbered 129 and 131 through 137. Other cams 138 through 144, also associated with distributor 128, function to control local operating circuits in a manner to be more particularly described hereinafter.

Figure 2:
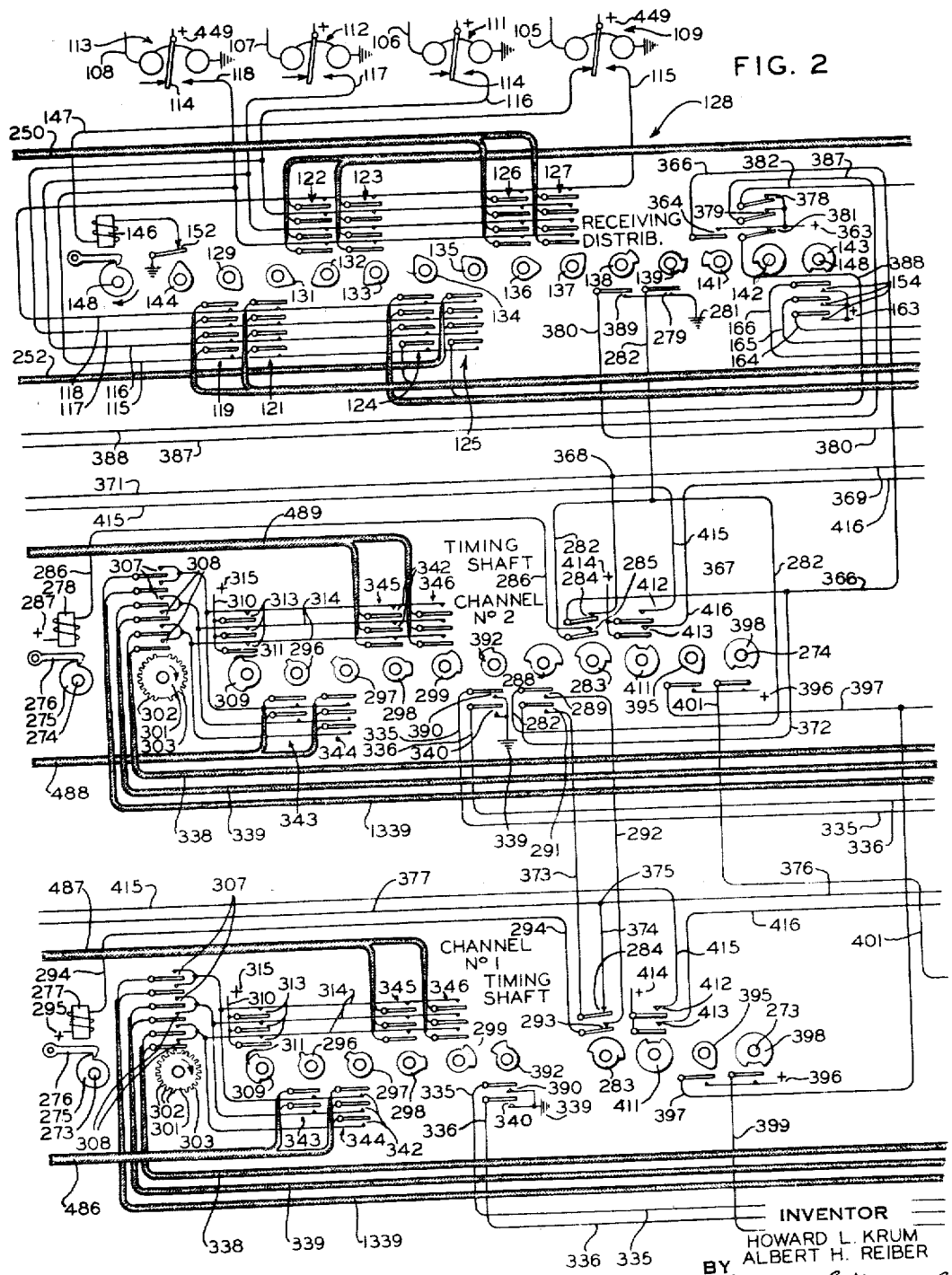
Figure 4:
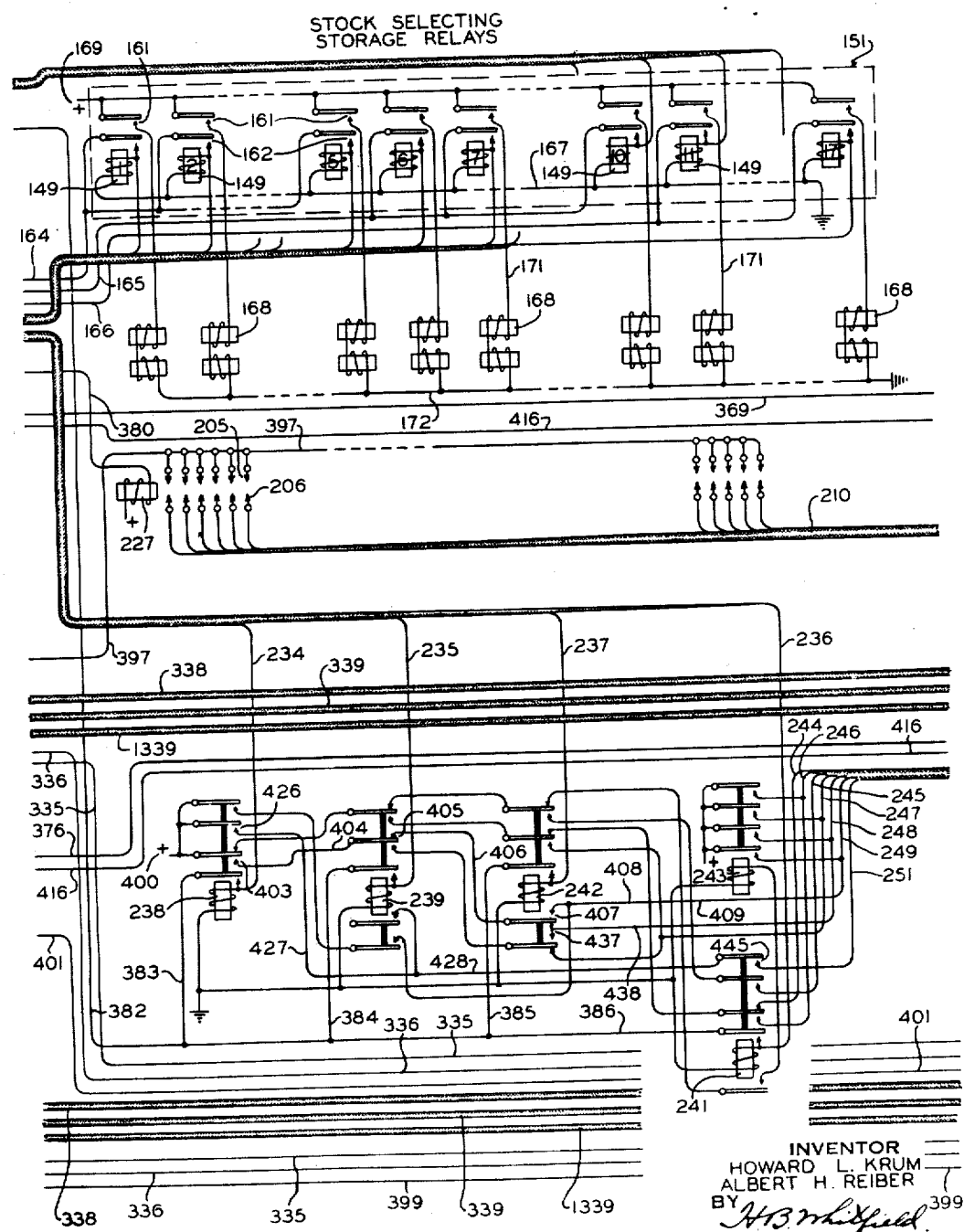

The timing arrangement of the several cams 129 through 144 is substantially as indicated in Fig. 2. These cams are designed to operate successively from cam 129 to cam 137 but because the illustrated diagram of Fig. 2 contains a staggered arrangement of the contact banks 119 to 127, some being on one side of the shaft and some on the other, the angular progression of the apices of cams 129 to 137 is altered by the disposition of the contact banks. The irregularity is in appearances only, however, and would be simplified by visualizing all of the contact banks on one side only of the shaft 148, in which case their associated cams would be brought into a more readily perceptible progressive series such as that of cams 64 to 72 of the transmitting distributor 61. When the distributor 128 is at rest, cams 142 and 144 are in their closed positions holding contacts 152, 378, 379, and 381 in engagement with their associated contacts, but upon the energization of clutch magnet 146 occasioned by a spacing impulse received over conductor 105 and local circuit 147, shaft 148 is released and cams 129 through 137 are brought successively into their closed condition. The results of the closure of each of these cams, last named, is a preparation of four collector circuits connecting the thirty-two contact points of the receiving distributor 128 with the storage elements of either the stock selecting unit, the range relays, or the primary answer relay bank. Accordingly, each cam 129 to 137 releases four signal impulses, the first seventeen impulses going to the stock selecting storage relays 149, the next four to the range relays, etc. In Fig. 4 the stock selecting unit is indicated diagrammatically; the mechanical features thereof however may be better understood by referring to Figs. 7 to 10 which will be more particularly described later. When the seventeen stock selecting signals are stored in the storage relays 149, the condition of the several relays respectively corresponds to the electrical conditions of the seventeen stock selecting impulses received, and since each relay is provided with a locking circuit, the selection is momentarily locked in the relay bank 151. The energization of any of the storage relays 149 causes the closure of a pair of contacts 161 and 162, the latter ones comprising part of the individual locking circuit of each relay, which circuit may be traced from positive potential 163, Fig. 2, through contacts 154 over conductors 164 to 166, depending in which of these series the particular relay happens to be connected, through contact 162, thence through the winding of the relays 149 to the common grounded conductor 167. The closure of the other contact 161 of each storage relay 149 establishes an energizing circuit for its associated stock selector operating magnets 168 from positive potential 169, through the contacts 161, conductors 171, through the winding of magnets 168 to the common grounded conductor 172.

*Stock selector unit*

As indicated in Figs. 7 to 10, the stock selector unit includes a set of compactly designed selector banks mounted on a base casting 175. The number of these units which may be employed at any particular station will depend, of course, upon the number of stocks which it may be desired to serve. In accordance with the operating principles of the unit about to be described, it has been found that five hundred or more selections can be conveniently accommodated by the arrangement of the tiers 176, each of which contains one hundred individually selectable elements 177. In other words, though an infinite number of tiers may be arranged parallelly as shown consistent with the mechanical limitations of the arrangement, it has been definitely established that at least five such tiers can be associated in a single hookup and driven from a single unit, as well be presently explained.

Magnets 168, seventeen in number, are staggered as indicated in Figs. 7 and 10 so as to permit compactness about the region of the transfer elements and operating shaft 178. The energization of any magnet 168 attracts its armature 179, moving the setting needle 181 inwardly so as to engage and shift its corresponding selector lever 182. It should be particularly noted that alternate selector levers 182 are similarly shaped while the intermediate ones differ in slight detail, viz., the location of the contacting surface 183. This feature also is designed to conform with the staggering of the magnets 168. In opposition to the influence of magnets 168, each setting lever 182 is instantly returned when its associated magnet 168 becomes deenergized. The condition of each magnet 168 is transmitted to its lever 182, resulting in the latter's disposition either as indicated in solid or dotted lines, depending accordingly upon its energization or deenergization. A set of T-shaped transfer levers 184, corresponding in number to the levers 182 and carried upon a common shaft 185, receives the settings of the several levers 182. Upon the rotation of shaft 178, cam 186 reciprocates the rocking bail 187, thrusting shaft 185 and the several levers 184 toward and into engagement with levers 182. Projections 188 of selector levers 182 coming into engagement with the associated lugs 189 or 191 of levers 184 rock the latter members accordingly and then in turn, through their disc and socket connections 192 with the transverse connecting bars 193, communicate the settings thereto. The seventeen connecting bars 193 are each provided with a plurality of notches 194, into each of which is received one end 195 of a reciprocating lever 196. The opposite end of each lever 196 is rounded and engages the end cam surface of a notched selector bar 197, the notches of which are distributed regularly on both edges so as to permit the disposition of selectable elements 177 on both sides thereof. Springs 198 tend to keep the selectable elements in their full right-hand extremity as viewed in Fig. 10, but when a particular lever 196 is disposed in the position indicated in full lines in this illustration engaging with its rounded end the proximate cam surface of bar 197, the latter is moved against the tendencies of its spring 198 into its extreme left-hand position as illustrated by the subjacent selector bar 197 shown in this figure.

Since there are seventeen transverse rods 193, there are accordingly seventeen levers 196, and in each vertical tier 176 seventeen selector bars 197. Each selector bar 197 is capable of two positions; there being seventeen selector bars. The total permuted possibilities of a selector mechanism of this type would therefore be two to the seventeenth power. For each cycle of operation or permutative selection, a certain disposition of the seventeen bars 193 (Fig. 9) is made, affording an alignment of notches of bars 197 that will correspond to the individually disposed lugs 199 of one of the selectable elements 177, thereby affording to it a transverse clearance. Springs 201 (see Fig. 9) connecting opposite pairs of selectable elements 177 will then force such selected elements inwardly in the direction of the selector bars 197. A spreader cam 202 located at the lower extremity of the elements 177 and between projections 203 thereof makes periodic rotations, coming into the position illustrated in Fig. 9 during a short interval, and clearing the projections 203 so as to permit the selective motion to the element 177 that may be selected.

Each element 177 is provided with a hook 204 which engages an insulated portion of a contact spring 205. The selective movement of an element 177 through its hooked portion 204 moves its associated contact spring 205 into engagement with a contact point 206, closing thereby an individual selective circuit 210 (see Fig. 4), which establishes a path between one of the indicator units, to be described later, and the signalling channel so as to permit the recordation of the price or answer portion of a message.

The spreader cam 202, following the recordation of the price, continues in rotation until it assumes a position transverse to that illustrated in Fig. 9, whence its cam surfaces 207 reengage the projections 203 of elements 177, thrusting them outwardly and withdrawing the one that happens to be in selective position.

It should be noted that the selectable elements 177, though they are oppositely disposed in transverse alignments, are nevertheless of similar shape and may therefore be inserted into any position on either side of and upon any of the tiers 176. The notches upon the selector bars 197 are of regular occurrence while the disposition of the lugs 199 rightwardly and leftwardly in offset relation is peculiar to each selectable element 177. This construction permits of the interchangeability of the elements 177 so that the location of any one of them is not dependent upon any of the predetermined features of the unit.

The several spreader cams 202 are integrally formed with their associated transverse shafts 208 (Figs. 7 and 8) which in turn are driven from a common shaft 209 located parallelly with respect to and just below transverse bars 193. Shaft 209 is driven by a short drive shaft 211 which in turn is driven by gear 225 of the vertically disposed operating shaft 178 which also carries the operating cams of diverse mechanisms of the unit. Shaft 178 is driven through a toothed driving clutch 222, the driving element 223 of which is continuously rotatable with the driven gear 213 which in turn is actuated by a driven gear 214 secured to a drive shaft 215 which receives its motive power from the prime mover 216 through the gears 217.

Calling attention again to shaft 178 which has been referred to as the vertical operating shaft, it should be noticed that this shaft carries the rocking bail operating cam 186. This cam functions to reciprocate the transfer bail 187 as aforedescribed, and to thereby effect a transfer of the selective condition of the several selector levers 182 to their corresponding connecting bars 193.

Another cam 218, Fig. 10, cooperates with a detent jockey 219 for maintaining shaft 178 in a dormant condition by withholding the teeth of driven member 221 from clashing with those of driving member 223. The detent jockey 219 resists counterclockwise rotation of the driven assembly including shaft 178 which is mildly urged by the spring 224 forcing member 221 and through it beveled lug 229 downwardly against a similar bevel on the cooperating surface of armature 228. Upon release of armature 228, the movement of member 221 is permitted in a straight vertical line.

As stated before, shaft 178 is driven by shaft 215 through driven gear 213 which is carried by the driving portion 223 of clutch 222. To shaft 178 is fixedly secured driving gear 225 which drives shaft 211, while at its upper extremity shaft 178 carries the cams 186 and 218 and the longitudinally slidable driven portion 221 of clutch 222. When motion is imparted to the shaft 178 through clutch 222, the entire assembly including the cams 186 and 218 and the gear 225 is rotated, imparting motion to shaft 211 and spreaders 202 as well as the transfer mechanism.

This disengagement of clutch 222 is subjected to the electrical control of a magnet 227, Figs. 4 and 7, which influences the response of an armature 228, the opposite end of which carries a beveled projection (not shown) which is adapted to engage the beveled lug 229, Fig. 8, integrally formed with the driven portion 221. During the deenergized condition of magnet 227, armature 228 is influenced by a spring (not shown), presenting its beveled projection into the path of lug 229, so that upon the clockwise rotation of shaft 178, Fig. 10, portion 221 is cammed upwardly, Fig. 8, out of engagement with driving portion 223 and against the tendencies of clutch spring 224. Upon the energization of magnet 227, armature 228 is attracted, causing its opposite end to be withdrawn from engagement with lug 229 and permitting driven portion 221 to come into engagement with the driving portion 223.

Each stock or commodity selector element having a particular code combination may be identified by suitable markings on its associated selectable element 177 or by the dispositon of its lugs 199 which correspond consecutively to the selective signals of its particular message. To remove any element 177 from its position, it is but necessary to disconnect its spring 201, after which any element 177 may be pulled directly upward after moving its upper end slightly inwardly to unhook it from the rod 231. An element 177 may be removed from its slot 233, Fig. 7, and any other element 177 replaced in its stead. This interchangeability of elements 177 affords a practice for quickly and easily delegating a given position in an arrangement of stock indicators to any desired stock.

Range selector

Referring now to the next four signal impulses which are received over the distributor segments 18 through 21 and which are found in contact banks 124 and 125 of the local receiving distributor, it will be noted that the circuits 234 to 237 leading therefrom communicate with a set of chain relays 238, 239, and 241 to 243. These relays, acting upon their associated contact banks, are designed to establish signal communication over certain one or ones of seven range channels 244 to 249 and 251. By variously permuting the signal impulse combinations which are received over lines 234 to 237, the range combinations that are established over lines 244 to 251 may be obtained as indicated in the range chart of Fig. 14. In obtaining the selective energization of certain ones only of the seven range circuits 244 to 249 and 251, the relays 238 to 243 utilize a chain interconnecting arrangement locking up for the duration in which the receiving distributor cam 142 presents its extensive apex to close the contact pair 378.

Answer relay banks

Figure 3:
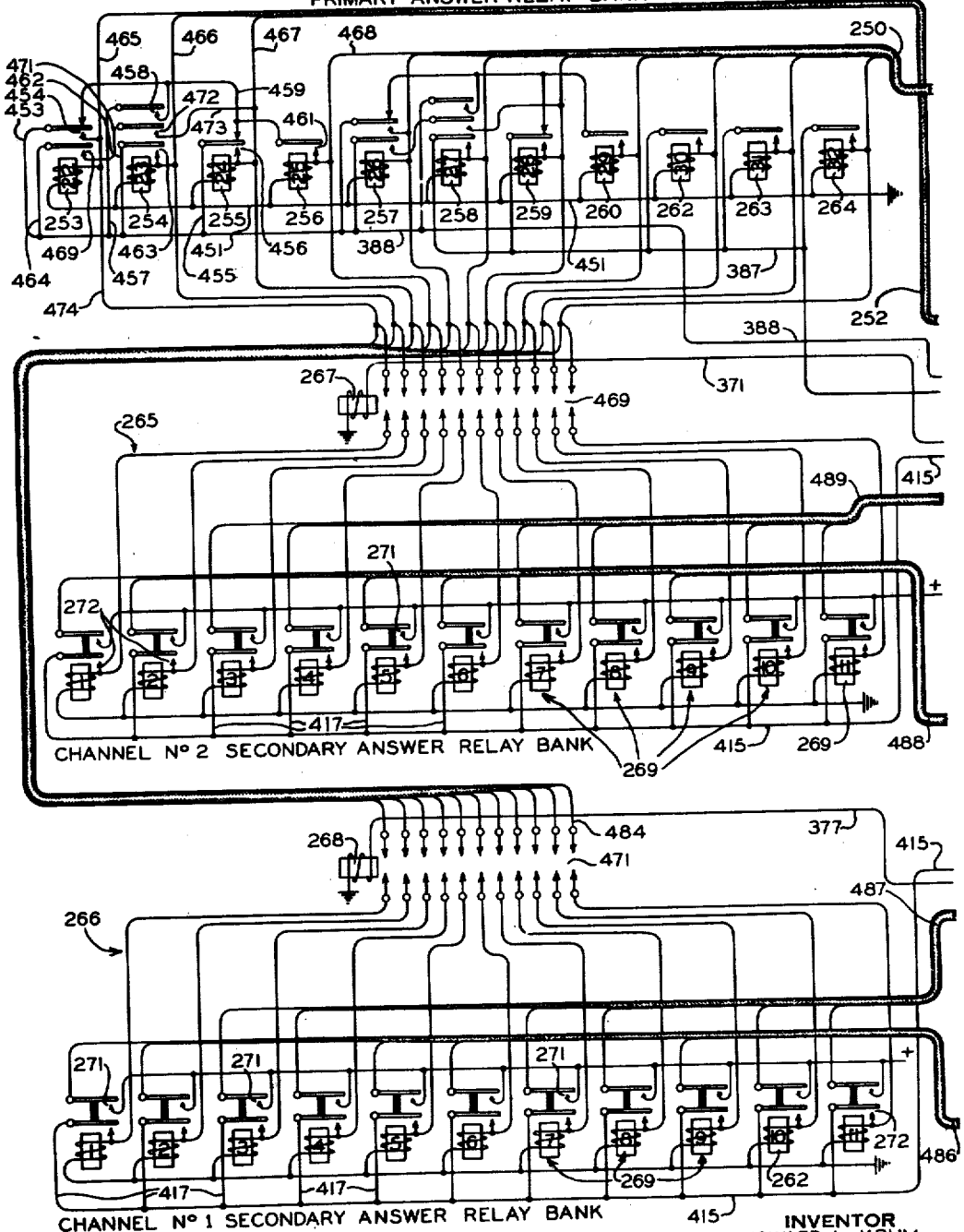

The remaining signal impulses coming through the receiving distributor 128; namely those numbered 22 through 32, are transmitted over cables 250 and 252 to a corresponding set of relays 253 to 264 which comprise the set marked primary answer relay bank in Fig. 3. Of these relays, those indicated 253 through 256 relate to the tens integer recording signal, 257 through 260 to the units integer recording signal, and 262 through 264 to the fractions signal. The relays 253 through 264 comprise a bank which will be referred to hereinafter as the primary answer relay bank, as distinguished from the secondary answer relay banks 265 and 266. The function of the primary answer relay bank is to store the price or answer signals until such time in the cycle at which they may be transferred to one or the other of the secondary answer relay banks.

In using the word cycle in connection with the present disclosure, there is meant the unit operation in terms of 360° of revolution of shaft 148 of the receiving distributor. Thus a so-called cycle includes the consecutive revolutions of the channel No. 1 timing shaft 273 as well as that of the channel No. 2 timing shaft 274.

The provision of dual mechanisms for the attainment of a division of the burden of operaton as herein described is generally referred to as channelling, and is provided for the primary object of increasing the speed or capacity of the receiving station apparatus.

In the provison of a channelling system such as the one about to be described, an arbitrary determination is first made at the transmitting station delegating certain messages into one channel and others into another channel. A typical system is disclosed and described in copending application Serial No. 510,536, and reference may be had to the disclosure in that application for a comprehensive understanding of that portion of the system which relates to the transmitting apparatus, the improvements in the instant case having application more particularly to that portion of the system which relates to the receivng apparatus only.

In accordance with the channelling system disclosed in the copending application referred to, stock quotation messages are arbitrarily divided into two groups, as determined by their initial selecting character, and are classifiable in a first group relating to stock quotation messages whose initial character is found in the alphabetical series between A and K, while those of the second or other group are of the remainder whose initial selecting character is found in the alphabetical series between L and Z. Accordingly, messages are transmitted in alternate pairs and where succeeding stock quotation messages relate to the same channel, means are provided at the transmitting station for automatically inserting blank signals to the other channel. In this manner the two branches of the system both at the transmitting station as well as at the receiving station are maintained in alternative cycles of operation.

Since, then, each message is predestined for one or another of the two channels in accordance with its period in the receiving distributor cycle, the routing of the messages to the indicator units is also of predetermined response so that, as will appear, each channel of the receiving station system is initiated into operation by a start signal originating with the primary receiving distributor 128.

The primary answer relay bank, in addition to functioning as a storage unit, acts also as a translating unit, in which capacity it converts the standard numeral code into a special code that is adapted to be used with a pulsing unit such as disclosed in Figs. 12 and 13. A comparison of the two codes may be made by reference to Fig. 14 in which is indicated a standard figures code and the translated code of Fig. 15 that is adapted to the present system of transmission.

In effecting the translation, relays 253 to 256 function as a chain system for the translation of the tens digit code, relays 257 through 260 for the units digit, and relays 262 through 264, which relate to the fractions code, requiring no change from the standard fractions code function, merely acting as direct storage relays.

Secondary answer relay banks

The channel No. 1 and channel No. 2 secondary answer relay banks are of identical structure and each comprises a series of eleven storage relays 269. The transfer of the price signals into each of these banks is controlled by a pair of gang relays 267 and 268, the latter relating to the channel No. 1 bank, while the former relates to the channel No. 2 bank. The energization of each of these gang relays is controlled by a cam located on an associated timing shaft individual thereto and more particularly described hereinafter. The signals stored upon the secondary relay banks are transferred by means of distributor cams located upon the associated timing shafts. Each relay 269 of bank 265 or 266 is provided with a pair of contacts 271 and 272, one of which is the active signal routing contact 271 while the other 272 closes a locking circuit for maintaining the particular relay 269 in an energized condition after having been thus established by the reception of a control signal from its associated primary answer relay.

*Channel timing shafts*

A pair of timing shafts 273 and 274 of similar construction are associated, the former with the channel No. 1 secondary relay bank 266 and the latter 274 with the channel No. 2 secondary relay bank 265. Accordingly, the timing shafts 273 and 274 will be referred to as the channel No. 1 and channel No. 2 timing shafts respectively. Each shaft is frictionally driven and is provided with a stop disc 275 through which an armature 276 restrains it from rotation until released by a clutch control magnet 277 or 278. The energization of clutch control magnets 277 and 278 is effected through cam 139 of the receiving distributor 128, which distributor completes two cycles of operation to one each of the timing shafts 273 and 274, closing the contact pair 279 twice in successive cycles and thereby introducing ground 281 over the circuit 282. By means of the signal control circuit 282, timing shafts 273 and 274 are maintained in alternate cycles of operation. This performance will be understood by noting that during the stop position of shaft 274 cam 283 maintains contacts 284 and 285 closed, completing the energizing circuit 282 over line 286 to the clutch magnet 278 and thence to positive potential 287. During the alternative condition, however, when timing shaft 274 has completed a half cycle of revolution and the receiving distributor is entering upon its second cycle and is again closing the contacts 279, cam 283 and shaft 274 are found in a position approximately 180° from that illustrated in Fig. 2, leaving the contact 285 open while cam 288 at this time presents its apex for closing the contacts 289 and 291. Contact 289 being located upon a continuation of the circuit 282 completes a circuit over line 292, thence through contacts 293 which correspond identically in structure and location to the contacts 285 of the timing shaft 274, continuing over conductor 294 to magnet 277 and positive potential 295, thereby releasing the channel No. 1 clutch 275 at a time during which channel No. 2 shaft 274 has completed a half cycle of revolution. In this manner cam 139 of the receiving distributor 128 maintains the timing shafts 273 and 274 in alternate synchronism.

In Fig. 2, shafts 273 and 274 of the channel No. 1 and channel No. 2 timing apparatus are both illustrated in the normal or rest positions. Under ordinary conditions of operation, however, both of these shafts may not be found in their normal positions simultaneously.

Referring now more particularly to Fig. 12, attention is directed to the pulsing cams 296 to 299 and to the right-hand portion of the chart in Fig. 13 which illustrates the timing diagram of the aforementioned pulsing cams. These illustrations have application both to the channel No. 1 as well as to the channel No. 2 timing shafts and with respect to the particular embodiments, the two structures are identical both in detail as well as in operation. A portion of the timing diagram indicated "answer" is divided into ten parts, which represent the ten intervals of the answer cycle, while the ten divisions of the preceding portion indicated "restoration" are similarly divided. The combined timing chart represents a complete revolution of either shaft 273 or 274 and is comprised of a restoration cycle and an answer cycle.

At the extreme left of the shaft there is secured a pulsing cam 301 which resembles a gear wheel having two oppositely disposed cut away portions where a few of the teeth are missing, leaving the remaining teeth in two groups of ten teeth each. The ten teeth indicated 302 are the restoring projections, while those indicated 303 are the answer or price signalling projections. A pulsing member 304 is provided with a beveled nose 305 which lies in the path of the teeth of cam 301 so that when the latter is rotated in the direction of the arrow 306, regular pulsations are imparted to the member 304, causing the latter to alternately open and close its contacts 307 and 308.

Adjacent cam 301 is another cam 309 of somewhat smaller radius having an apex portion 311 which coincides radially with the restoration teeth 302 of cam 301. Contactor 312, generally similar to the member 304, is adapted to be engaged by the apex 311 during the rotation of the timing shaft and to close the contacts 313 during the interval of time in which the teeth 302 come into engagement with the nose 305 of member 304.

The apices of cams 296 to 299 are of variant length, as better indicated by the timing diagram, Fig. 13. The length of the apex of cam 296 and its interval of occurrence correspond to the first tooth of the series of teeth 303, while those of cam 297 correspond to the succeeding two teeth of the series indicated 303. The apex of cam 298 corresponds in length to the cyclic interval of four teeth beginning at the conclusion of the third tooth of the series and extending through the seventh, while the apex of cam 299 extends through an interval of seven teeth, the first four of which coincide cyclically with those of cam 298, but the remaining three of which extend beyond and coincide with the final three teeth of the general group indicated 303.

The length and coding arrangement of the teeth of cams 296 to 299 may be better understood by noting the chart on the right-hand side of Fig. 13 where the several codes are indicated diagrammatically in terms of the answer cycle.

Figure 14:
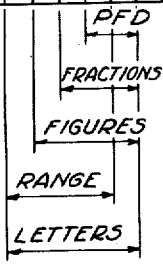
Fig. 14 is a chart illustrating the standard transmission codes.
Figure 6:
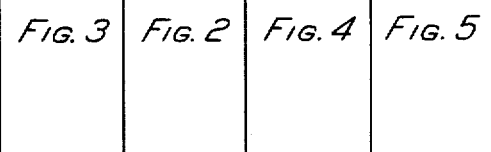
Fig. 6 is an arrangement sketch showing the positions of Figs. 1 to 5 and the placement of the sheets upon which these figures are located to develop the complete system.

In operating an indicator such as that illustrated in Fig. 11, the movement thereof is induced by a succession of electrical pulsations. This system of operation is referred to as the step-by-step system of operation, and the timing shafts 273 and 274 are provided for the express purpose of converting the permuation codified price signals, as indicated in Fig. 14, to the step-by-step signals which are employed for operating indicators of this class. Cam 301 and member 304 serve therefore as a mechanical means for interrupting the current that flows over circuits 314 so as to induce pulsated currents thereover. During that portion of the cycle when the teeth 302 create the pulsations, the actuating current is derived from source 315, Fig. 2, over line 310, through contacts 313, and because apex 311 is continuous, ten pulsations corresponding to the ten teeth 302 are always transmitted to the indicators. These pulsations are for the purpose of restoring the indicators to their zero or no integer position, after which they are in readiness for receiving a new recordation under the control of the pulsating teeth 303.

To better understand the functioning of the pulsing cams 296 to 299 during the transmission of the answer or price signals, the description of the indicator units will now be had, after which the further operation of the timing shafts will be continued.

*Indicator units*

Particular attention will now be had to Figs. 5 and 11. In Fig. 5, the diagrammatic arrangement of the indicator units is illustrated, each unit comprising five horizontal rows of integers, the upper row including four integers while each of the other rows contains but three, the fourth or hundreds integer being imputed to the remaining numbers. In accordance with the preferred arrangement, the upper row is assigned to the "yesterday's closing" quotation, the second row to the Open, the third to the High, the fourth to the Low, and fifth to the Last or current quotation. Each indicator unit is assigned to the quotation of a particular stock which may lie in either of the two previously designated channels No. 1 or No. 2. Manual switching means are provided for switching the several contactors 316 (see Fig. 5) so as to make them communicable with the terminals of either channel, while the gang relays 317, which are energized by the selection of an element in the stock selector unit, operate to render the particular indicator unit responsive to the signals coming over the channel to which it has been assigned.

Each digits indicator comprises a drum dial 318, Fig. 11, which is carried by a stub shaft 319. A sprocket wheel 321, also secured to shaft 319, is rotatably controlled by a pallet lever 322 pivoted at 323 and reciprocable by the intermittent energization and deenergization of a magnet 324 in cooperation with a retractile spring 325. In the circuit over which is energized the magnet 324 there is contained a pair of contact springs 326 whose contacting surfaces are presented in the path of a pair of annular rings 327 and 328, the latter of which is grounded over line 330 at 329 and is provided with an opening at 331. The former ring 327 is continuous and is provided with an inwardly extending projection 332 presented in the region in which the other ring 328 has its opening 331. The contact springs 326 are adapted to each engage one of the rings 327 or 328, except when upon the rotation of the indicator assembly the projecting portion 332 comes into alignment therewith, at which time both contact springs 326 engage the ring 327 for a purpose to be more fully understood in the course of the following description.

The inner rings 328 of the several indicator dials are connected over conductor 330 to a common ground at 329. The outer rings 327 of the several indicators are divided into two groups; the hundreds and units indicator rings 327 communicate through one conductor 333 with a contactor 393 which connects with a conductor 335 leading from contact pair 390 of the channel No. 2 timing shaft actuating ground cam 392. The tens and fractions indicator rings 327 communicate in a similar manner through another conductor 334 with a contact 391 which connects with a return conductor 336 with a ground contact 340, which obtains ground from a common source 339 and in a similar manner to ground contact 390. The purpose of dividing the ground supply between the two conductors 335 and 336 is to alleviate the current load to which a single conductor might be subjected.

Positive potential for the purpose of restoration is obtained from plus sources 315 indicated with both the timing shaft 273 and shaft 274. During the restoration interval, the apex 311 of cam 309 closes the several contactors 313, introducing plus potential over collector circuits 314.

Each drum 318 carries a consecutive series of ten numeral digits beginning with 1 and ending with 0, and has, in addition, a blank or no integer indicating position. To assure accuracy in the positioning of each integer, there is provided a ratchet disc 350 having a number of teeth corresponding to the positions to be assumed by the dial 318 and a detent spring 337 for engaging the teeth of ratchet 350 for maintaining and securing the proper positioning of the dial 318 upon the rotation thereof to display any of its integers. The indicator illustrated in Fig. 11 is supported behind a masking plate that is provided with each unit and that has openings or sights through which only the selected integer of the drum 318 is visible.

Referring now to the timing shafts 273 and 274, it will be observed that each is provided with three collector circuits 314 already referred to above. These circuits communicate with the contact points 342 of the contact banks 343 through 346, as well as with the contact points 313 which are controlled by the restoration cam 309.

In order to minimize the current requirements for pulsating the magnets 324 of several numeral indicators, the three collector circuits 314 are divided as indicated at the contacts 307 and 308, into three cables 338, 339, and 1339 which lead to various ones of the range relay banks generally indicated 348 for the channel No. 1 and 349 for the channel No. 2.

*Range relay banks*

As indicated in Fig. 5, there is provided one range relay bank for each of the two channels. Each bank contains seven relays 351 to 357. The first relay 351 has but the single function of operating the hundreds digit indicator. Relays 352 through 356 each operate the tens, units, and fractions dials of the Close, Open, High, Low, and Last indicators respectively, and the remaining relay 357 functions in a special capacity indicated No reset, modifying the performance of the other relays by preventing the usual restoration of the tens indicators of certain of the ranges prior to the installation of a new price quotation.

The energization of any of the relays 351 through 357 results in the establishment of a path over which the price signals are receivable by those indicator dials of each indicator unit that are to be selected. More particularly, there being five range indications in each indicator unit, viz., Close, Open, High, Low, and Last, and it being desired at various times to operate certain ones only of these several ranges, it is the function of the relays 351 through 357 of each range relay bank 348 or 349 to establish the corresponding circuit connections between the common pulsating source channel No. 1 timing shaft or channel No. 2 timing shaft and the desired one or ones of the range indicators of the selected indicator unit.

There is provided a cam 283 with each of the timing shafts 273 and 274. These perform an auxiliary control to the one described above in connection with the intercontrol circuit 282. A secondary contact 284 which is closed by the apex of cam 283 determines the energization of the secondary range relay bank gang relay 358 or 359 for closing the several range contacts 361 or 362 associated therewith. This is performed as a result of the selection of the particular timing shaft; when its cam 283 closes its contact 285 or 293, it simultaneously closes the pair of associated contacts 284 which introduces positive potential from source 363 when cam 141 of the receiving distributor 128 closes the contacts 364 shortly thereafter. The control circuit may be traced from positive potential 363, through the contactor 364, conductor 366, and in the case of chanel No. 2, branch 367, contact 284 of shaft 274 to the junction point 368. From this point a portion of the circuit follows line 369 to the relay 358, closing the gang contacts 361 of the channel No. 2 bank of secondary range relays 349, Fig. 5, while at the same time another portion of the circuit traceable from junction 368 over line 371 energizes the secondary answer relay bank gang relay 267, Fig. 3. Thus it will be noted that upon the selection of the channel No. 2 timing shaft 274, there follows the selection of the channel No. 2 secondary answer relay bank as well as the channel No. 2 secondary range relay bank, the latter two selections of which result from the performance of the single cam 283 of the channel No. 2 timing shaft 274.

When, instead, a particular message relates to the channel No. 1 selection, the control circuit is traceable from the positive source 363 over the same contact 364 as in the previous case, thence over line 366 to the branch 372. Since the position of the channel No. 2 shaft 274 does not at this time close the contacts 284 nor 285 but does, instead, close the contacts 289 and 291, the latter continues the aforedescribed circuit through contacts 291 over line 373 to the channel No. 1 control contact 284. This last mentioned contact being closed by its cam 283 continues the circuit over conductor 374 to junction point 375, which, as in the case of junction point 368, leads on the one hand over a conductor 376 to its range gang relay 359, closing its range contacts 362, and on the other hand over a conductor 377 to its answer gang relay 268. In this manner is tied up the storage transfer from the primary answer relay bank with the corresponding channel secondary answer relay bank while concurrently the associated channel range relay bank 348 or 349 is also closed in preparation for the ensuing delivery of the answer or price over the conductors 338, 339, or 1339 through the selected range or ranges in the selected indicator unit.

*Auxiliary timing control cams*

In addition to the functions already described, certain cams of the receiving distributor 128 and of the timing shafts 273 and 274 are provided for performing incidental control operations. Of these certain cams not yet fully described, cam 142 of the receiving distributor 128 is designed to close a bank of three contacts 378, 379, and 381. Contact 378 upon its closure introduces positive potential from current source 363 upon inductor 382 which communicates with the four range selecting chain relays 238 through 242 over circuit 382 and branches 383 to 386. These branches form part of locking circuits for holding any of the relays 238 to 242 in a locked condition after they are once energized by the selecting signals coming over conductors 234 to 237.

This locked condition prevails for an interval represented by the apex of cam 142, and upon riding off the apex thereof when contact 378 is opened, the locking circuit 382 is broken, restoring the range relays 238 to 242 to their normal or deenergized condition.

Another contact 379 of the bank operated by cam 142 introduces positive potential from source 363 over line 387 which serves as a locking circuit for certain of the relays 258 through 264 of the primary answer relay bank and the remaining contact 381, which is operated by cam 142, serves in a similar capacity for introducing positive potential from source 363 over line 388 which serves as a locking circuit for certain others of the relays, namely 253 through 257 of the primary answer relay bank.

Another cam 138 of the distributor 128 controls a single contact 389 for introducing ground 281 upon line 380 for closing a clutch magnet control circuit and energizing the clutch magnet 227 which initiates the cycle of operation of the stock selecting unit. Another cam 143, also carried by distributor 128, controls the locking circuits 164 to 166 of the stock selector storage relay bank 151, the performance of which has already been described in connection with the operation of the stock selector unit.

In each of the timing shafts 273 and 274 is provided a cam 392 which introduces ground 339, mentioned in connection with the particular description of the indicator illustrated in Fig. 11, for completing the circuits 335 and 336 over which are received the pulsations for a new stock indication, the other ground connection 329, which is employed during the reception of the restoration signals, being cut off when the inner contact spring 326 rides off ring 328. This new ground source is cut in at the proper time interval when the cam 392 of either channel closes the contacts 340 and 390, introducing the ground 339 over conductors 335 and 336, one of which supplies ground to the tens and fractions operating magnets 324 and the other to the units and hundreds operating magnets 324. The distribution over two conductors in this case, as in other cases hereinbefore described, is for the purpose of minimizing the current load requirements.

Another cam 395 found upon each of the timing shafts 273 and 274 serves to introduce positive potential from source 396 over circuit 397 common to the several contacts 205 of the stock selector unit. The current thus supplied continues over the selected one of the contact pair 205-206, thence over its individual circuit 210 to its associated gang relay 317, which conditions one of the indicator units for operation. Another cam 398 also carried upon the shafts 273 and 274 introduces positive potential from source 396 over conductors 399 and 401, and connector conductors 402, which provide a locking circuit for the selected gang relay 317, which has been energized shortly before by the stock selector unit.

Another pair of cams are indicated 411 on channel timing shafts 273 and 274, each of which cams serves mechanically to maintain a locking circuit closed for retaining an answer signal in its associated secondary answer relay bank 265 or 266 as well as to maintain locked the selected ones of its associated secondary range relay banks 348 or 349. In these capacities cams 411 engage a pair of contactors 412 and 413, introducing positive potential from a source 414 over related conductors 415 and 416 respectively. The locking circuits 415 leading from the respective timing shafts continue leftwardly, as viewed in Fig. 2, whence they connect with a plurality of branch circuits 417 to the locking contacts 272 of secondary answer storage relays 269.

The other locking circuits 416 continue rightwardly, as viewed in Fig. 2, to the junction point 418 from whence radiate a plurality of branch circuits leading to the several range relay locking contacts 419.

General operation

In order to better understand the performance of the present invention, a typical stock quotation will be traced from the point of its reception at the incoming conductor 21 and its specific application to the apparatus of the substation and local receiving station observed, noting as the description proceeds, any important variations which may be affected by certain other classes of messages, several of which the present system is adapted to accommodate. Taking as the standard message or stock quotation the reading ATT 155¾, certain important variations from this type of message, as, for example, in the quotation of the stock which comprises fewer than three selecting characteristics such as T or AT, it should be noted that the stock selecting unit provides for the accommodation of stock selecting characters of any number not exceeding three thereof. However, it should be understood that to increase the selecting character requirements amounts merely to an enlargement of certain features which are embodied initially in the present disclosure.

By way of summarizing certain features of the present invention, attention is directed to the subject matter of copending application Serial No. 510,536, certain features of which are also embodied in the present disclosure, both for purposes of explanation of the present system as well as for incorporation of certain elements into the present combination or combinations.

No reset

Of the secondary range relays 348 and 349, the bottom ones indicated 357 function as no reset selections. Upon the energization of these relays the tens value of a quotation remains unchanged. It is sometimes desirable, in the case of a quotation already displaying the desired tens integer value, to change only the units and fractions value. To obtain this result, a so-called no reset selection is transmitted. By viewing the standard code illustrated in Fig. 14 and noting the right-hand column, it will be seen that certain range quotations contain the parenthetical legend TUF, representing tens, units, and fractions change, while others are indicated UF, representing the units and fractions change solely. In the case of the latter code combinations, there is selected of the seven conductors 244 to 249 and 251 the no reset conductor indicated 251 in addition to one or more of the range conductors 244–249. When this occurs, one of the relays 357 is energized in addition to one or more of the relays 351–356. An example of one such operation is described hereinafter.

It will also be noted that in accordance with the indicator units illustrated, five range prices are provided, see Fig. 5, labeled Close, Open, High, Low, and Last. Of these, but one, the Close, is provided with four integers representative of yesterday's close quotation, the remaining four prices having but three integers. The integer which is thus omitted from the latter indicators is the hundreds quotation integer and it is preferably imputed to the remaining price indexes, based upon the showing of the yesterday's close index. To record a price change upon this dial, a special range signal is transmitted, the twenty-fourth signal on the standard code of Fig. 14. With this quotation, a tens digit signal is transmitted, which results in the selection of one of the relays 351 assigned to the special function of selecting the hundreds dial and channeling to it the tens signal conductor contained in the cable 1339.

The operation of the transmitting station in sending forth stock quotation messages of this class is fully explained and described in the copending application last mentioned, particular note being given to the system whereby the messages are classified or channeled into two groups. The transmitting and receiving distributors are then adapted to receive messages alternately from each of the groups and to accordingly treat the messages as belonging to one or the other of the groups as determined by the interval of a complete cycle during which the message was transmitted or received. In other words, a complete cycle is comprised of two message intervals, one relating to channel No. 1 and the other to channel No. 2, it being a condition incident to the transmission of each message that it shall be properly classified in accordance with its predetermined allocation into one or the other of the stock classifications.

The signals received on line 21 are re-created by relay 22 at the substation, Fig. 1, corresponding signals originating with the local source of current supply 24 and being translated into current and no-current signals as distinguished from the prevailing line signal practice of using plus and minus current conditions. The substation receiving distributor 26 rotating in synchronism with a corresponding distributor at the transmitting station receives the re-created signals over a conductor 25 leading to its distributor ring 28, whence they are sent forth through several segments of ring 27 to be stored in the storage relay banks 42, 43, and 44.

Thereafter the signals are effective simultaneously four at a time from the relays of the aforementioned storage banks and impressed on the four conductors 105 to 108 after being reconverted by the polarized relays 101 to 104 into plus and minus signal conditions suitable for line transmission.

The mechanism and apparatus described in the foregoing paragraph comprise the equipment of an intermediate or substation being located at a relatively greater distance from the transmitting station and in the proximate region of a number of receiving stations with each of which it communicates over the four aforementioned lines 105 to 108, Fig. 1.

The message ATT 155¾ will be distributed and stored as follows: The first five segments of the distributor 26 will route the five impulses of A to the first five storage relays of the bank 42. The next five relating to the second character T will be routed to the next succeeding five relays of bank 42, while the third five segments, numbered 11 through 15, will route the final character T. The next two segments 16 and 17 will, in this case, receive no signal impulses, indicating thereby a predetermined selective condition that the particular stock quoted is a common stock; other attributes of the stock such as first or second preferred being indicated by the transmission of other signal impulses that occupy this position in the message. Impulses coming in over the segments 16 and 17 are stored in the final two relays of the storage bank 42.

The next succeeding four signals receivable over segments 18 through 21 are stored in the bank indicated 43 and relate to a secondary selection generally identified as the Range. A better understanding of this selection may be obtained from its effect upon a selected indicator, as will appear later in this description. The next four impulses receivable over the segments 22 through 25 relate to the tens digit indication and occupy the first four relays of the bank 44. The next four impulses receivable over segments 26 through 29 relate to the units digit indication and are receivable over the second four relays of bank 44, while the final three impulses receivable over segments 30 through 32 are storable in the remaining three relays of the bank 44.

While the identity of the various signals and signal impulses has been maintained thus far, it may be well to note that the apparatus at the substation takes no cognizance thereof, but treats the impulses as so many units belonging to a message irrespective of the order or relationship which these impulses may have for purposes of ultimate selection or operation. In like manner the substation transmitting distributor, sending these impulses forth four at a time, groups them arbitrarily and without cognizance of their relationship.

This arbitrary grouping or scrambling of the message is important, however, insofar as the apparatus at the receiving station is concerned where by means of a receiving distributor 128 operating in an inverse manner to the transmitting distributor 61 of the substation, Fig. 1, rearranges the impulses into their original consecutive order.

Upon being received over the four incoming conductors 105 to 108, the grouped signals are again reconverted from plus and minus signals into corresponding current and no-current signals to accommodate the apparatus at the local receiving station. The converted signals are then carried to the four collector circuits 115 to 118 of the receiving distributor 128 whose cycle of revolution is the same as that of the substation transmitting distributor 61.

Fig. 2 illustrates the relative timing arrangement of the cams 129 to 144. Special contacts 79 and 81 communicating with the conductor 105 of the distributor 61 are adapted to transmit a pair of signal impulses that are utilized for the purpose of synchronizing the transmitting distributor 61 of the substation with the receiving distributor 128 of the local station. These special impulses are receivable over conductor 105 upon the initiation of each message and transmit stop and start impulses over the auxiliary conductor 147 to the receiving distributor clutch magnet 146, which releases the distributor shaft for rotation, opening the normally closed contact 152 and breaking the circuit 147, since its utility is thereafter not required until the initial reception of a succeeding message.

Cams 129 through 137, in the order designated, then operate to successively close their contact banks 119 through 127. As each bank is closed, it continues the path from the four collector circuits 115 through 118 to associated storage magnets such as, for example, in the case of bank 119 whose impulses are stored in the first four storage relays 149 of the bank 151, energizing such of them that receive current signals, and leaving deenergized the remaining ones whose signals are of the no-current condition. This transfer continues until the seventeen selecting impulses are stored in the seventeen storage relays of bank 151, following which the next four impulses enumerated 18 to 21 are transferred over conductors 234 to 237 to the range relays 238, 239, 241, and 242 and, in the same manner, the final eleven impulses to the storage relays 253 to 260 and 262 to 264 of the primary answer relay bank, Fig. 3.

Cam 143 maintains closed the contacts 154, locking the stock selection signals as they are received in the stock selector storage relays 149 by reason of the locking contacts 162 with which each relay 149 is provided. The condition of the several relays, which comprise stock selecting storage bank 151, is then substantially simultaneously transferred to the stock selector magnets 168. The stock selector unit, Figs. 7 to 10, now having the selecting impulses stored within its magnets 168, awaits the signal from cam 138 for releasing its clutch magnet 227.

Meanwhile the four range signals numbered 18 to 21 are received by the magnets 238 to 242 and establish one or more paths over circuits 244 through 251 as follows: Suppose, as in the case of the arbitrary quotation that has been taken, ATT 155¾ is a current or Last quotation, then the tens, units, and fractions digit signals only are transmitted, thus ATT 55¾, as is the usage in commodity and stock quotation transmission.

Reference will now be had to the large code chart indicated in Fig. 14 where on the fourteenth line there appears the Last code combination (TUF) included within the first four impulses and comprised of a current condition in the first and fourth positions and no-current conditions in the second and third positions. This signal has been set off with heavy outline in the illustration in Fig. 14 for the sake of convenience, and in order to assist in understanding this explanation. It should be noted here that the Last code combination on line fourteen includes a tens, units, and fractions indication (TUF) and that distinguishing therefrom the code combination on the tenth line, being also for the Last quotation includes but a units and fractions change (UF). In accordance with the parlance of the present description, the latter range signal is spoken of as having the no-reset feature and as mentioned above, results in the energization of one of the no-reset relays 357 of the secondary range relay banks 348 or 349.

Accordingly in the case of the chosen range signal there is impressed a current impulse upon conductor 234 and one upon conductor 237, energizing the relays 238 and 242 but permitting the relays 239 and 241 to remain unenergized. The resulting circuit is then traceable from positive potential 400 through contact 403, which is now closed due to the energization of magnet 238, over conductor 404 through contact 405, which remains closed due to the non-energization of relay 239, over conductor 406 through contact 407, which is closed on account of the energization of magnet 242, thence over conductors 408 and 409, conductor 249, over its particular contact 361 or 362, depending upon whether the particular stock relates to channel No. 1 or channel No. 2, conductor 421, through the winding of relay 356 to the common ground wire 422. This energizes the Last relay 356 and closes its objective contacts 423 as well as its locking contact 424. The locking circuit for relay 356 is traceable from ground wire 422, connecting conductor 425 through the winding of relay 356, over circuit 426, through the contacts 424 to the junction point 418, thence over conductor 416, through the contacts 413 of the timing cam 411, which is provided for the purpose of keeping the relay 356 energized until a predetermined interval in the rotation of the associated timing cam shaft 273 or 274, to plus current at 414, following which contact 413 is opened, breaking the locking circuit 416.

To assist in the better understanding of the operation of the range selecting chain of relays 238 to 242, another range condition will now be traced including the no-reset relay selection which shall establish the connection with more than one of the range relays 351 to 357, it being borne in mind that in the previous example only the Last relay 356 was energized. Let us now suppose that the same quotation, ATT 155¾, happens to be the Low quotation and that the price signals thereof are intended to affect the units and fractions indicators only and not the tens indicator. The range signal corresponding to this condition is illustrated on line 12 of the chart of Fig. 14 (outlined in heavy border), and comprises a current condition in the first and third positions and a no-current condition in the second and fourth positions. Referring now to Fig. 4, this would result in an energization of range relays 238 and 241 and the remaining in an unenergized condition of relays 239 and 242. The resulting circuits are then traceable from positive potential 400 through contact 426, because relay 238 is now energized, thence over conductors 427 and 428, contact 445, because relay 241 is now energized, thence over conductor 251, its contact 361 or 362, conductor 446 to the winding of the no-reset relay 357, thence to the common ground 422. The energization of relay 357 opens the contacts 429, 431, and 432 and closes the contact 433, the latter of which is a locking contact for maintaining relay 357 in an energized condition in a manner similar to that described in connection with relay 356. The opening of contact 429 breaks the circuit which connects the pulsing cam contacts 307 through cable 1339 with the tens circuit 434 which leads through a contact 441 to the tens digit of the Low indicator. The opening of contacts 431 and 432 breaks the circuit which leads from the tens contact 307 of pulsing cam 301, to the tens circuits 435 and 436 which lead to the tens digit of the High and Last indicators. With the tens circuits of the High, Low, and Last indicators opened, the pulsations of the cam 301, both during the restoring cycle as well as during the answer or price recording cycle, are ineffective as to these indicators, leaving them quiescent and in the condition in which they were placed by the previous quotation in which they were active and results in there being no change in their indications.

As a further result of this range selection, relay 355 is also energized over the following circuit: From positive potential 400 through the contact 403, which is now closed due to the energization of relay 238, over conductor 404, through the contact 405, which is now closed due to the deenergization of relay 239, over conductor 406, through the contact 437, which now remains closed due to the deenergization of relay 242, over conductors 438 and 248, thence over its associated contact 361 or 362, to conductor 439, through the winding of the Low range relay 355, thence to the common ground wire 422. Energization of the Low relay 355 is modified, however, by the concurrent energization of relay 357 to an extent whereby though contact 441 is closed by the energization of relay 355, nevertheless the tens circuit 436 remains broken due to the opening of contact 431 of relay 357. In all other respects the selection of relay 355 corresponds to the first described selection of relay 356, causing the recordation of the stock quotation message ATT 5¾, the tens digit being omitted in accordance with the aforedescribed no-reset feature of omitting certain digits from quotations where there is no change involving such digits.

Other features of the range control relay chain 238 to 242 are explained and described in copending application Serial No. 510,536, and for a more complete understanding of the operation of each of the other range selections indicated on the chart, Fig. 14, reference may be had thereto. The results will now be traced of the eleven answer or price signal impulses from the point in the foregoing description of operation in which they were stored in the primary answer relay bank comprised of the relays 253 to 264.

*Price or answer channeling*

Referring particularly now to Figs. 14 and 15 and upon comparing the code indicated in Fig. 15 with the figures digit code of Fig. 14, it will be noted that a certain discrepancy exists in the code combinations for the figures digits 9 (line 21) and 0 (line 19). In the standard code combination the digit 9 includes current impulses in the second, fourth, and fifth positions and a no-current impulse in the third position, whereas in the modified code combination of Fig. 15 there appear current impulses in but the second and fourth positions and no-current impulses in the third and fifth positions (the figures code spans the code elements from No. 2 to No. 5 inclusive). Also, that in the case of the zero digit the standard signal includes current impulses in the second, third, and fifth positions and a no-current impulse in the fourth position, whereas in the modified chart there are current impulses in the second, third, fourth, and fifth positions. This discrepancy in code characteristics is a result of the inherent requirements of the step-by-step code system since each impulse is utilized in the selection for operating one of the pulsing cams 296 to 299 of Fig. 12 whereas in the conventional code a necessary impulse is lacking. Thus a current condition in the second position selects for operation the pulsing cam 299 whose pulsing intervals include the last seven of the pulsing teeth 303 of the main pulsing cam 301. The positive impulse in the third position selects for operation the pulsing cam 298 whose interval is equivalent to four of the teeth 303 which are included within the longitudinal alignment of the seven teeth of cam 299. Similarly, positions four and five select cams 297 and 296, respectively. Fig. 13 indicates diagrammatically the length and corresponding alignment of the cams 296 to 299 as compared with the answer portion 303 of the main pulsing cam 301.

In the selection of any digit from 1 to 9, the numerical order of the digit represents the number of impulses which are required to step the indicator so as to indicate the corresponding digit, and the zero digit is indicated by the stepping of ten impulses. In accordance with the standard code combination, current impulses in their proper positions do select and properly preset the indicators in accordance with the transmission system up to and including the digit 8, but thereafter in the digits 9 and 0 the standard code combinations are improper for accomplishing this purpose, hence provision is made in the chain arrangement of the relays 253 to 260 for converting the standard code combinations for the digits 9 and 0 into the modified code combinations indicated in Fig. 15. The means for accomplishing this comprises the relays 253 through 261, which serve not only as storage relays but also as translating relays. These changes are necessary in the tens and units relays 253 to 261 only, because in the fractions indication are used in the digits from 1 to 7 for representing eighths of stock quotation prices, hence the relays 262 to 264 are simple locking storage relays and are provided with no chain circuits as are the other primary answer relays 253 to 260.

The translation of a standard code, Fig. 14, combination to a modified code, Fig. 15, combination may be traced as follows: In accordance with the standard nine's digit code, code impulses are received in the tens relays over conductors 465, 467, and 468 and no-current over conductor 466. This would result in the energization of relays 253, 255, and 256 only, over the following circuits: from positive potential 449 through the local control circuits 109 to 113 over conductors 115 to 118, to the particular receiving distributor contacts, in this case those relating to the twenty-second, twenty-fourth, and twenty-fifth signal impulse segments which are found in banks 125 and 126. Thereafter the circuit continues over conductors 465, 467, and 468 of cables 250 and 252, through the windings of magnets 253, 255, and 256 to the common ground wire 451. As the distributor 128 continues in operation, however, the initial signalling impulses are discontinued and instead certain locking circuits are established for maintaining the proper ones of the relays 253 to 256 in locked condition. In order to effect the desired translation, relays 253 and 255 must be maintained energized while relay 256 must be released. This is accomplished by the cam 142 of distributor 128, which closes the contact 381, introducing the current supply 363 over conductor 388. Circuits are traceable from conductor 388, over branch 453, Fig. 3, through the contact 454 with which the armature of relay 253 is found in engagement on account of the signal energization of relay 253, thence over the portion of circuit 465 through the winding of relay 253 to the common ground wire 451, thus holding relay 253 in locked condition. Another circuit is traceable from the common wire 388 through the branch 455 through the contact 456 with which the armature of relay 255 is found in engagement on account of the signal energization of relay 255, thence through a portion of the conductor 467 through the winding of relay 255 to the common ground wire 451, holding relay 255 in locked condition. In the case of the third relay 256, however, no branch from the common wire 388 is found, so that when the signalling current potential is cut off and no locking circuit established, it becomes deenergized, thereby effecting the translation of the numerical figure 9 code combination.

In the case of the numerical figure zero code combination, this translation is accomplished in the following manner, it being remembered that in the original the current conditions are found in the second, third, and fifth positions with a no-current condition in the fourth position, whereas it is desired in the converted code to provide current conditions in the second, fourth, and fifth, and no-current conditions in the third. Accordingly, the initial signal impulses are introduced over conductors 465, 466, and 468 with a no-current condition over conductor 467. Here as in the previous case the progress of the distributor 128 holds closed the contacts 381, introducing locking current 363 over conductor 388. In the case of relay 253, the circuit is traceable over branch 453, contact 454, through the winding 253 to the common ground 451, as in the previous case. In the case of relay 254, the circuit is traceable through the common wire 388 over branch 457, through contact 458, which is found closed on account of the signal energization of relay 254, thence over conductor 459, through the armature of relay 256, through contact 461, which is found closed on account of the signal energization of relay 256, through a portion of conductor 468 through the winding of relay 256 to the common ground wire 451, thus maintaining relay 256 in the locked condition. Relay 254 is maintained locked over a circuit traceable from the common wire 388, through the branch 462, contact 463, which is found closed on account of the signal energization of relay 254, a portion of conductor 466, through the winding of relay 254 to the common ground wire 451, thereby maintaining locked relay 254.

In the case of relay 255, however, the current supplied from source 363 over conductor 388 does not serve as a locking circuit but in this case as the original energizing current over a circuit traceable from the common wire 388, through branch 464, contact 469, which is now found closed on account of the initial energization of relay 253, through conductor 471, contact 472, which is now found closed on account of the initial energization of relay 254, conductor 473, a portion of conductor 467, through the winding of relay 255 to the common ground wire 451, thus energizing relay 255.

The energized condition of any of the relays 253 to 264 introduces a current condition upon its associated transfer conductors 474 to 484, which current continues through its associated contact pair 469 or 471 upon the energization of either gang relay 267 or 268, causing a transfer to be made to its secondary storage relay 269 of the channel No. 1 or channel No. 2 secondary relay bank 265 or 266, depending upon the predetermined characteristics of the particular message.

The foregoing explanation illustrating the translation from a standard figures code to a modified figures code has been explained in connection with the tens digit of the primary answer relay bank, including the relays 253 to 256. The translation of the units digits may be consummated in similar manner since, as will be noted upon observation, the units relays 257 through 261 are provided with a similar intercontrol chain circuit as are the tens relays 253 to 256. A separate locking circuit 387 and contact 379 are provided therefore which correspond to the contact 381 and locking circuit 388.

Gang relays 267 and 268 are energized over circuits 371 and 377, respectively, as described above, when in accordance with the cyclic selection of timing shafts 273 or 274 their cams 283 close contacts 284. This closes the several contacts 469 or 471, transferring the storage condition from the primary answer relay bank to the proper secondary relay bank, after which, upon the continued rotation of distributor 128, cam 142 opens the contacts 379 and 381, releasing the locking circuits 387 and 388 and restoring the primary answer relay bank to normal condition.

From the storage in the secondary answer relay bank the signals are continued over cables 486, 487, 488, or 489 to their associated contacts of the timing shafts 273 or 274, whence they are distributed by cams 296 to 299 over the collector circuits 314 and thereafter over cables 338, 339, or 1339 to the respective digits indicators of those numerical stock indicators which relate to the proper range or ranges, as determined by the range selection, which is effected by relays 351 through 357 described above in association with the secondary range relay banks.

While there has been disclosed and described a signalling system and apparatus embodying a certain specific structure, it will be understood that numerous modifications and variations may be made without departing from the spirit or scope of the present invention. It is therefore intended not to be limited to any specific illustrations in the accompanying drawings, nor to the description in the foregoing specification except as defined in the hereunto appended claims.

What is claimed is:

1. In a storage system, a set of storage relays, a corresponding set of signal transmission lines, means for issuing signals to said set of relays over said lines for energizing said relays, a main locking circuit associated with said relays, and means for altering the energized condition of said relays following the reception of electrical signals over said transmission lines comprising contactors associated with certain of said relays and auxiliary locking circuit paths connecting with said main locking circuit said associated contactors in prearranged succession.

2. In a telegraph system of signal distribution, a signal controlled pulsing mechanism comprising a rotatable shaft, a disc having pulsing projections carried by said shaft, a series of variably timed contactors controlled by said shaft, pulsing circuits associated with said contactors at said pulsing disc, means under the control of line signals for selecting said contactors permutably and for thereby determining the number of pulsing operations, and means under the control of local mechanism including said shaft for determining the time interval of said pulsations.

3. In a stock quotation system, a repeating station having a single line receiving apparatus, a receiving station, a plurality of lines connecting said repeating station with said receiving station, means at said repeating station for registering a plurality of signals received singly in an original consecutive sequence over said line, apparatus at said repeating station for transmitting groups of signals corresponding to said plurality of signals simultaneously over said plurality of lines to said receiving station in a regimented succession indiscriminately grouped with respect to the intelligence characteristic of said signals, and means at said receiving station for reassembling said groups of signals into their relationship in said original consecutive sequence.

4. In a stock quotation repeating system, a single line receiving distrbiutor having segments corresponding in arrangement and number to the ordinal sequence of the signal elements of a message, said signal elements being predeterminedly assigned in definite groups to the permuted signals of a code, a corresponding number of storage relays each associated with one of said segments for momentarily storing a signal condition received over its segment, and a retransmitting distributor including contact closure members operable in arbitrary groups differing in number from the number of said predeterminedly assigned signal elements constituting a signal for retransmitting said message elements in arbitrary groupings and irrespective of the signal relationship of the said elements.

5. Storage apparatus and automatic correcting means therefor comprising a set of storage relays, a set of energizing circuits associated each with one of said relays and connected to a source of signal distribution, code signal transmitting means under the control of said relays to transmit an individual signal corresponding to each permutable condition of energization of said relays, and inter-related connections between certain of said relays established in accordance with a predetermined energization of the several of said relays for thereafter altering the energized condition of said relays.

6. In a signal transmission system, a permutation code receiving distributor, a transmitting distributor capable of sending intermittent impulse signals, a set of storage relays energized permutably in accordance with signals received over said receiving distributor, transmitting contacts operated by said transmitting distributor and under the control of said storage relays for issuing intermittent impulse signals in accordance with the stored permutation code signals, and means responding to certain permuted settings of said storage relays including circuit connections therebetween for altering said storage setting to accommodate said intermittent impulse transmitting distributor.

7. In a stock quotation system, a permutation code signal receiving distributor having permutation code elements, a signal transmitter for sending intermittent impulses, a plurality of contacts associated with said intermittent impulse transmitter and cam means shaped in accordance with an aggregating progressive sequence for actuating said contacts, a set of storage relays under the control of said permutation code elements of said receiving distributor for conditioning said transmitter distributor contacts, and means to alter a permutation code stored in said relays comprising a chain circuit established under the control of certain of said permutation code signals for effecting the energization of said storage relays to produce a different permuted energization thereof.

8. A system for signal distribution which comprises a distributor for receiving a succession of consecutive telegraph signals each comprised of a uniform number of impulses, a storage device for effecting a temporary registration of each signal of said succession, a transmitter for issuing numbers of said impulses different from said uniform number comprising said signals under the control of said storage device simultaneously, a second distributor for receiving simultaneously said number of impulses, and storage means under the control of said second distributor for registering said numbers of impulses routed to it by said second distributor.

9. In a telegraph distribution system, mechanism for scrambling and unscrambling a succession of signal elements of invariable number comprising characters of a message including a plurality of storage members of a number corresponding to said elements, means for setting said storage members, a remote station, a plurality of retransmission lines fewer in number than said elements extending to said remote station, a plurality of storage devices at said remote station of a number corresponding to said elements, means for routing signal elements simultaneously over said plurality of lines to said remote station storage devices in accordance with said setting of said storage members, and means for generating under the control of said remote station storage devices said invariable number of signal impulses having the original order of succession.

HOWARD L. KRUM.
ALBERT H. REIBER.

CERTIFICATE OF CORRECTION.

Patent No. 2,147,656. February 21, 1939.

HOWARD L. KRUM, ET AL.

It is hereby certified that error appears in the printed specification of the above numbered patent requiring correction as follows: Page 5, first column, line 16, strike out the word "full"; page 13, first column, line 1-2, for "preset" read present; line 16, strike out the word "in"; and that the said Letters Patent should be read with this correction therein that the same may conform to the record of the case in the Patent Office.

Signed and sealed this 30th day of May, A. D. 1939.

Henry Van Arsdale
Acting Commissioner of Patents.

(Seal)

cession of signal elements of invariable number comprising characters of a message including a plurality of storage members of a number corresponding to said elements, means for setting said storage members, a remote station, a plurality of retransmission lines fewer in number than said elements extending to said remote station, a plurality of storage devices at said remote station of a number corresponding to said elements, means for routing signal elements simultaneously over said plurality of lines to said remote station storage devices in accordance with said setting of said storage members, and means for generating under the control of said remote station storage devices said invariable number of signal impulses having the original order of succession.

HOWARD L. KRUM.
ALBERT H. REIBER.

CERTIFICATE OF CORRECTION.

Patent No. 2,147,656.     February 21, 1939.

HOWARD L. KRUM, ET AL.

It is hereby certified that error appears in the printed specification of the above numbered patent requiring correction as follows: Page 5, first column, line 16, strike out the word "full"; page 13, first column, line 1-2, for "preset" read present; line 16, strike out the word "in"; and that the said Letters Patent should be read with this correction therein that the same may conform to the record of the case in the Patent Office.

Signed and sealed this 30th day of May, A. D. 1939.

Henry Van Arsdale
Acting Commissioner of Patents.

(Seal)